US012387607B2

(12) United States Patent
Paul et al.

(10) Patent No.: US 12,387,607 B2
(45) Date of Patent: Aug. 12, 2025

(54) UNMANNED AIRCRAFT CONTROL USING GROUND CONTROL STATION

(71) Applicant: Joby Aero, Inc., Santa Cruz, CA (US)

(72) Inventors: Travis Paul, Petaluma, CA (US); Marc Francois Xavier Piette, Orinda, CA (US); Maxime Marie Christophe Gariel, San Francisco, CA (US); Anna Dietrich, Petaluma, CA (US); Evan Michael Wilson, San Mateo, CA (US); Craig Milliard, San Francisco, CA (US); Ryan Olson, San Francisco, CA (US); Phillip Jones, Oakland, CA (US); Adam Shelly, San Francisco, CA (US)

(73) Assignee: JOBY AERO, INC., Santa Cruz, CA (US)

( * ) Notice: Subject to any disclaimer, the term of this patent is extended or adjusted under 35 U.S.C. 154(b) by 452 days.

(21) Appl. No.: 17/546,482

(22) Filed: Dec. 9, 2021

(65) Prior Publication Data
US 2022/0189316 A1  Jun. 16, 2022

Related U.S. Application Data

(60) Provisional application No. 63/123,675, filed on Dec. 10, 2020.

(51) Int. Cl.
*G08G 5/21*       (2025.01)
*G05D 1/00*       (2024.01)
(Continued)

(52) U.S. Cl.
CPC ............. *G08G 5/21* (2025.01); *G05D 1/0022* (2013.01); *G08G 5/26* (2025.01); *G08G 5/30* (2025.01); *G08G 5/54* (2025.01)

(58) Field of Classification Search
None
See application file for complete search history.

(56) References Cited

U.S. PATENT DOCUMENTS

| 3,035,789 A | 5/1962 | Young |
| 4,022,405 A | 5/1977 | Peterson |

(Continued)

FOREIGN PATENT DOCUMENTS

| EP | 0945841 A1 | 9/1999 |
| EP | 2698749 A1 | 2/2014 |

(Continued)

OTHER PUBLICATIONS

ASTM International, "Standard Specification for Detect and Avoid System Performance Requirements", ASTM International, May 1, 2020, 22 pages.

(Continued)

*Primary Examiner* — Behrang Badii
*Assistant Examiner* — Paysun Wu
(74) *Attorney, Agent, or Firm* — DORITY & MANNING, P.A.

(57) ABSTRACT

An aircraft includes a flight plan and contingency data including a plurality of contingency landing sites. An aircraft communication system communicates with a ground control station via a communication link and detects a lost communication scenario in response to degradation in the communication link. An aircraft flight control system controls the aircraft en route according to the flight plan. In response to detecting the lost communication scenario, the flight control system routes the aircraft back to a last known location in which the communication link was not degraded. In response to failure to re-establish the communication link, the flight control system selects a landing site based on a current aircraft location relative to a plurality of potential (Continued)

landing sites including an origin airport, a destination airport, and a first continency landing site. The flight control system controls the aircraft to approach and land at the selected landing site.

20 Claims, 27 Drawing Sheets

(51) Int. Cl.
  *G08G 5/26* (2025.01)
  *G08G 5/30* (2025.01)
  *G08G 5/54* (2025.01)

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 8,016,226 B1 | 9/2011 | Wood |
| 8,020,804 B2 | 9/2011 | Yoeli |
| 8,078,350 B2 | 12/2011 | Coulmeau |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 8,897,935 B2 | 11/2014 | Meunier et al. |
| 9,188,978 B2 | 11/2015 | Sacle et al. |
| 9,205,930 B2 | 12/2015 | Yanagawa |
| 9,355,566 B2 | 5/2016 | Garrido-Lopez et al. |
| 9,387,928 B1 | 7/2016 | Gentry et al. |
| 9,410,807 B2 | 8/2016 | Savarit et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,663,237 B2 | 5/2017 | Senkel et al. |
| 9,694,911 B2 | 7/2017 | Bevirt et al. |
| 9,734,724 B2 | 8/2017 | Zammit et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,302,759 B1 | 5/2019 | Arteaga |
| 10,304,344 B2 | 5/2019 | Moravek et al. |
| 10,330,482 B2 | 6/2019 | Chen et al. |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2003/0128122 A1* | 7/2003 | Reynolds .......... B64D 45/0031 340/945 |
| 2003/0222795 A1 | 12/2003 | Holforty et al. |
| 2009/0125221 A1 | 5/2009 | Estkowski et al. |
| 2009/0259402 A1 | 10/2009 | Gates et al. |
| 2010/0079342 A1 | 4/2010 | Smith et al. |
| 2012/0194556 A1 | 8/2012 | Schmitt et al. |
| 2012/0221175 A1* | 8/2012 | Spinelli ............. H04B 7/18508 701/2 |
| 2013/0338856 A1* | 12/2013 | Yelland ................. B64C 13/20 701/2 |
| 2014/0142787 A1* | 5/2014 | Tillotson ................ H04K 3/224 701/3 |
| 2014/0179535 A1 | 6/2014 | Stückl et al. |
| 2016/0311529 A1 | 10/2016 | Brotherton-Ratcliffe et al. |
| 2017/0092137 A1* | 3/2017 | Hiebl ................... G05D 1/0022 |
| 2017/0197710 A1 | 7/2017 | Ma |
| 2017/0229023 A1* | 8/2017 | Connor .............. H04L 43/0811 |
| 2017/0357914 A1 | 12/2017 | Tulabandhula et al. |
| 2018/0018887 A1 | 1/2018 | Sharma et al. |
| 2018/0053425 A1 | 2/2018 | Adler et al. |
| 2018/0216988 A1 | 8/2018 | Nance |
| 2018/0225976 A1* | 8/2018 | Rinehart .................. G06N 7/01 |
| 2018/0308366 A1 | 10/2018 | Goel et al. |
| 2018/0354636 A1 | 12/2018 | Darnell et al. |
| 2019/0012925 A1 | 1/2019 | Barker |
| 2019/0146508 A1 | 5/2019 | Dean et al. |
| 2019/0221127 A1 | 7/2019 | Shannon |
| 2019/0316849 A1 | 10/2019 | Abrego et al. |
| 2019/0381977 A1 | 12/2019 | Kanagarajan et al. |
| 2020/0103922 A1 | 4/2020 | Nonami et al. |
| 2020/0160734 A1* | 5/2020 | Priest ....................... G08G 5/58 |
| 2020/0388166 A1 | 12/2020 | Rostamzadeh et al. |
| 2020/0393852 A1* | 12/2020 | Rozenberg ............. G08G 5/006 |
| 2020/0410879 A1 | 12/2020 | Reinquin et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Bennaceur et al., "Passenger-centric urban air mobility: Fairness trade-offs and operational efficiency", Transportation Research Part C: Emerging Technologies, 2022, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

\* cited by examiner

| # | Flight Stage | UA-GCS | Operator | Ground Crew | Description |
|---|---|---|---|---|---|
| 1 | Flight Stage | UA-GCS | Operator | Ground Crew | Description |
| 2 | Flight Planning | Execute | Informed | N/A | Gathers all relevant weather information pertaining to the flight |
| 3 | Flight Planning | Execute | Informed | Action Required | Calculates initial weight and balance |
| 4 | Flight Planning | Execute | Informed | N/A | Completes fuel planning |
| 5 | Flight Planning | Execute | Supervise | N/A | Utilizes preformance models, fuel planning, fuel prices, and knowledge of subsequent flights to determine fuel load considering hedging |
| 6 | Flight Planning | Execute | Informed | N/A | Completes takeoff and landing performance calculations |
| 7 | Flight Planning | Execute | Action Required | N/A | Files flight VFR or IFR flight plan |
| 8 | Pre-Flight | Execute | Supervise | Execute | Computes final weight and balance |
| 9 | Engine Start | Execute | N/A | Supervise | Set parking brake |
| 10 | Engine Start | Execute | Informed | N/A | Checks for prop clearance |
| 11 | Engine Start | Execute | Action Required | Supervise | Starts the engine(s) |
| 12 | Taxi | Execute | Supervise | N/A | Taxis to edge of controlled movement area (taxiway if untowered) |
| 13 | Taxi | Execute | Supervise | N/A | Communicates intentions with ground control or CTAF as approraite |
| 14 | Taxi | Execute | Supervise | N/A | Observes traffic condition and determines taxi path (if untowered) |
| 15 | Taxi | Execute | Supervise | N/A | Follows the loaded and approved taxi path to the run up area |
| 16 | Taxi | Execute | Informed | N/A | If obstacles are present, detects obstacles on the taxiway |
| 17 | Taxi | Execute | Supervise | N/A | Avoids obstacles and follows runway signage and markings |
| 18 | Taxi | Execute | Supervise | N/A | Requests and receives permission to enter runway and takeoff using standard airport communication channels. (ATC interaction) |

FIG. 15A

| # | Phase | Col3 | Col4 | Col5 | Description |
|---|---|---|---|---|---|
| 18 | Taxi | Execute | Supervise | N/A | Requests and receives permission to enter runway and takeoff using standard airport communication channels. (ATC interaction) |
| 19 | Take-off | Execute | Supervise | N/A | Initiate taxi out onto the runway |
| 20 | Take-off | Execute | Supervise | N/A | Configures lights for takeoff |
| 21 | Take-off | Execute | Supervise | N/A | Taxis out onto the runway |
| 22 | Take-off | Execute | Informed | N/A | Lines up with the centerline |
| 23 | Take-off | Execute | Supervise | N/A | Accelerates to take off speed |
| 24 | Take-off | Execute | Informed | N/A | Maintains center line |
| 25 | Take-off | Execute | Supervise | N/A | Rotates at appropriate speed |
| 26 | Climb | Execute | Supervise | N/A | Follows ATC instructions |
| 27 | Climb | Execute | Supervise | N/A | Performs climb checklist |
| 28 | Cruise | Execute | Informed | N/A | Detects other aircraft (DAA) |
| 29 | Cruise | Execute | Supervise | N/A | Observes its environment (Terrain, weather, airspace, …) |
| 30 | Cruise | Execute | Supervise | N/A | Modifies trajectory to avoid other aircraft |
| 31 | Cruise | Execute | Supervise | N/A | Makes adjustments to flight path for environment |
| 32 | Cruise | Execute | Supervise | N/A | Makes adjustments to flight path that are due to faults |
| 33 | Cruise | Execute | Supervise | N/A | Makes adjustments to flight path based on ATC instruction |
| 34 | Land | Execute | Supervise | N/A | Selects Landing Runway |
| 35 | Land | Execute | Supervise | N/A | Selects approach path / procedure |
| 36 | Descend | Execute | Supervise | N/A | Approaches the destination airport |
| 37 | Descend | Execute | Supervise | N/A | Declares aircraft intent |
| 38 | Descend | Execute | Supervise | N/A | Interacts with ATC or CTAF if required |

FIG. 15B

| | | | | |
|---|---|---|---|---|
| 39 | Descend | Execute | Supervise | N/A | Initiate approach into airport based on ATC instructions if required |
| 40 | Descend | Execute | Supervise | N/A | Determine approach into airport based on current traffic configuration and ATC |
| 41 | Descend | Execute | Supervise | N/A | Configure navigation equipment for landing (emphasis on IFR instrument procedures) |
| 42 | Hold | Execute | Supervise | N/A | Prepares to and performs a missed approach (if needed) |
| 43 | Hold | Execute | Supervise | N/A | Follows landing checklist to prepare to land |
| 44 | Hold | Execute | Supervise | N/A | Follows landing procedures to touchdown |
| 45 | Taxi | Execute | Supervise | N/A | Pulls off the runway at a safe speed |
| 46 | Taxi | Execute | Supervise | N/A | Initiates taxi based on ground control instructions or standard procedures |
| 47 | Taxi | Execute | Supervise | N/A | Taxis to the cargo delivery area or directly to a ramp |
| 48 | Taxi | Execute | Informed | N/A | Detects obstacles on the taxiway |
| 49 | Taxi | Execute | Supervise | N/A | Avoids obstacles and follows runway signage and markings |
| 50 | Terminal | Execute | Informed | N/A | Follows shutdown checklist |
| 51 | Terminal | Execute | Informed | N/A | Logs the hobbs or tach time |

FIG. 15C

UNMANNED AIRCRAFT CONTROL USING GROUND CONTROL STATION

CROSS-REFERENCE TO RELATED APPLICATION

This application claims the benefit of U.S. Provisional Application No. 63/123,675, filed on Dec. 10, 2020. The disclosure of the above application is incorporated herein by reference in its entirety.

FIELD

The present disclosure relates to unmanned aircraft control.

BACKGROUND

An unmanned aircraft system may include an unmanned aircraft (e.g., without an onboard pilot) and other unmanned aircraft system components, such as a ground-based controller. In some implementations, an unmanned aircraft may include sensors, a software stack, actuators, a communication system, and other components. The sensors may provide information about the aircraft state. The unmanned aircraft control system may execute the software stack to control the aircraft actuators based on acquired sensor information in order to pilot the aircraft during a planned mission. In some implementations, the communication system may provide for control and data exchange during a mission. An unmanned aircraft may implement various degrees of autonomy during a mission. In some cases, an unmanned aircraft may be controlled by a human operator at a ground control station.

SUMMARY

In one example, the present disclosure is directed to an aircraft comprising one or more memory components configured to store a flight plan and contingency data including a plurality of contingency landing sites. The aircraft comprises a communication system and a flight control system. The communication system is configured to communicate with a ground control station via a communication link while the aircraft is en route from an origin airport to a destination airport and detect a lost communication scenario in response to degradation in the communication link between the aircraft and the ground control station. The flight control system is configured to control the aircraft en route from the origin airport to the destination airport according to the flight plan. In response to detecting the lost communication scenario, the flight control system is configured to route the aircraft back to a last known location in which the communication link was not degraded between the aircraft and the ground control station. The communication system is configured to attempt to re-establish the communication link at the last known location. In response to failure to re-establish the communication link at the last known location, the flight control system is configured to select a lost communication landing site from a plurality of potential landing sites based on a current location of the aircraft relative to the plurality of potential landing sites, wherein the potential landing sites include at least one of the origin airport, the destination airport, and a first contingency landing site included in the contingency data. The flight control system is configured to control the aircraft to approach and land at the selected lost communication landing site.

In one example, the present disclosure is directed to non-transitory computer-readable medium comprising computer-executable instructions configured to cause one or more processing units of an aircraft to store a flight plan on the aircraft, store contingency data including a plurality of contingency landing sites, communicate from the aircraft with a ground control station via a communication link while the aircraft is en route from an origin airport to a destination airport, and detect a lost communication scenario in response to degradation in the communication link between the aircraft and the ground control station. The instructions are further configured to control the aircraft en route from the origin airport to the destination airport according to the flight plan. In response to detecting the lost communication scenario, the instructions are configured to route the aircraft back to a last known location in which the communication link was not degraded between the aircraft and the ground control station and attempt to re-establish the communication link. In response to failure to re-establish the communication link at the last known location, the instructions are configured to select a lost communication landing site from a plurality of potential landing sites based on a current location of the aircraft relative to the plurality of potential landing sites, wherein the potential landing sites include at least one of the origin airport, the destination airport, and a first contingency landing site included in the contingency data. The instructions are configured to control the aircraft to approach and land at the selected lost communication landing site.

BRIEF DESCRIPTION OF THE DRAWINGS

The present disclosure will become more fully understood from the detailed description and the accompanying drawings.

FIGS. 15A-15C illustrate a table that includes high level function allocation by phase of flight.

In the drawings, reference numbers may be reused to identify similar and/or identical elements.

DETAILED DESCRIPTION

Figure 1A:
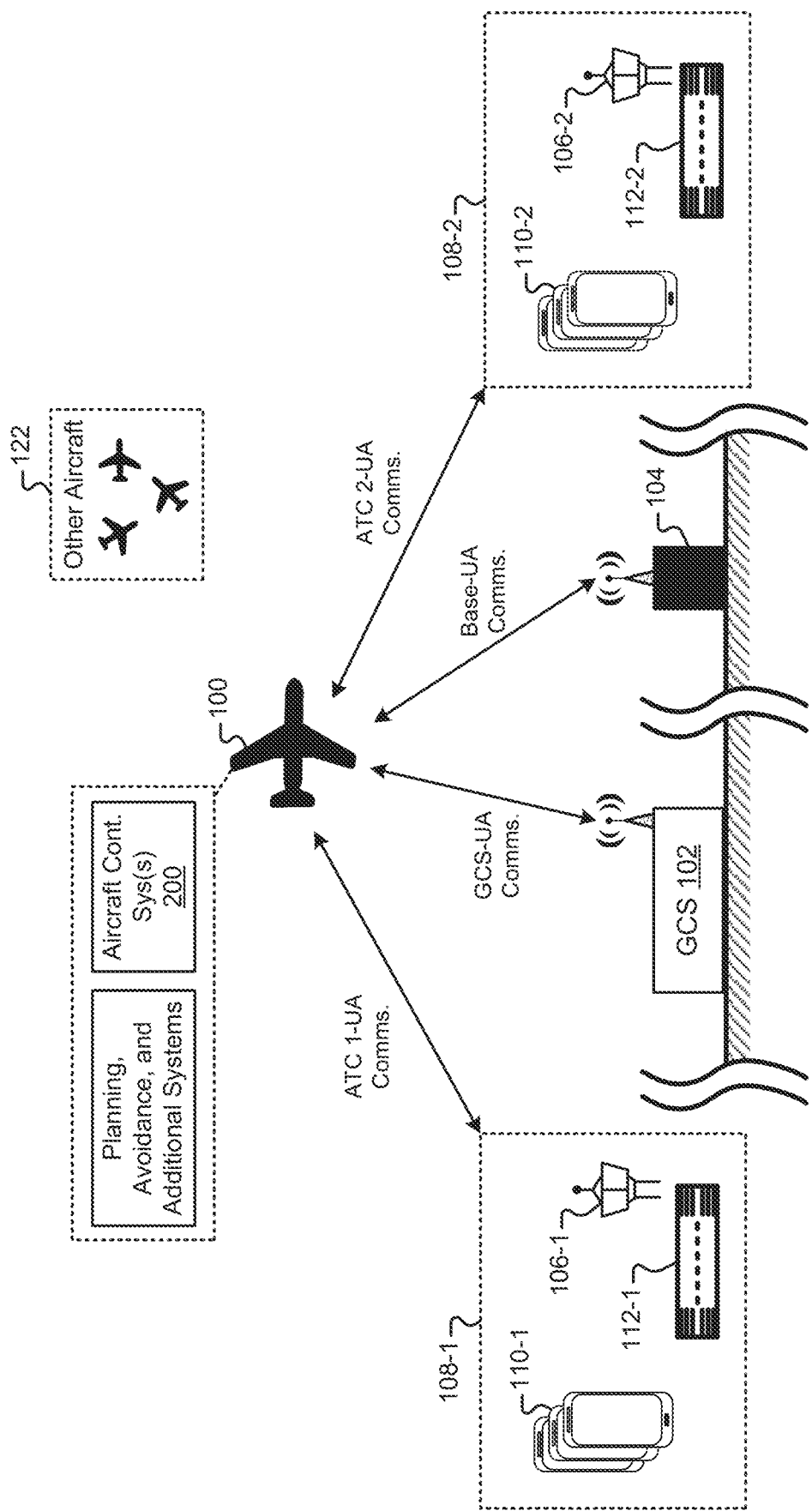
FIG. 1A illustrates an example environment that includes an aircraft that may communicate with a ground control station (GCS), one or more base stations, and one or more air traffic control towers (ATCs).

FIG. 1A illustrates an example environment that includes an aircraft 100 that may communicate with a ground control station 102 (GCS 102), one or more base stations (e.g., base station 104), and one or more air traffic control towers 106-1, 106-2 (ATCs 106). The aircraft 100 described herein may be an unmanned aircraft (UA), such as an unmanned cargo aircraft. The aircraft 100 may automatically taxi and takeoff from an origin/departure airport 108-1 (hereinafter "origin airport 108-1"). The aircraft 100 may execute a flight plan and arrive at a destination/arrival airport 108-2 (hereinafter "destination airport 108-2"). The aircraft 100 may also automatically taxi to a final location at the destination airport 108-2 after landing.

The aircraft 100 and the GCS 102 may communicate at any time prior to flight, during flight, and after flight. The aircraft 100 and GCS 102 may generate and exchange a variety of types of data, depending on the specific implementation of the aircraft 100 and GCS 102. In some implementations, the aircraft 100 and/or GCS 102 may generate and modify taxi plans for the airports 108. For example, the GCS 102 may generate a taxi plan and upload the taxi plan to the aircraft 100 for execution. In some implementations, the aircraft 100 and/or GCS 102 may generate and modify flight plans for execution by the aircraft 100 while in flight between airports 108. For example, the GCS 102 may generate a flight plan and upload the flight plan to the aircraft 100. In this example, the GCS 102 and/or the aircraft 100 may modify the flight plan during flight.

The GCS 102 and the aircraft 100 may communicate during flight. In some implementations, the GCS 102 may include one or more human remote operators ("operators") that may control and monitor the aircraft 100 during flight. For example, a remote operator in the GCS 102 may send flight commands to the aircraft 100 and receive data from the aircraft 100 and other sources. Although a GCS 102 using a single operator is described herein, the GCS 102 may include more than one human operator. The human operators may have different roles described herein, such as a remote pilot and flight engineer. For example, a remote operator may be referred to as a remote pilot if the operator meets specific qualifications and performs specific responsibilities. In some implementations, the GCS 102 may also be referred to as an aircraft operations center ("AOC").

In some implementations, the aircraft 100 and the GCS 102 may communicate via one or more communication base stations 104 that are located along the aircraft's route. For example, a base station 104 may relay data from the aircraft 100 to the GCS 102 and vice versa. In this example, a base station 104 may receive/transmit data from/to the aircraft 100 (e.g., via a line of sight link). The remotely located base station 104 may transmit/receive data to/from the GCS 102 via another communication link (e.g., the Internet). Although a single base station 104 is illustrated in FIG. 1A, multiple base stations may be located along the aircraft flight path. Additionally, one or more base stations may be located at an airport (e.g., the destination airport 108-2) that is remotely located from the GCS 102. Using base stations along the flight path and/or at the airports may help ensure that the aircraft 100 and GCS 102 can communicate via one or more reliable communication links.

The aircraft 100 may communicate with one or more ATCs 106 via radio, such as a very high frequency (VHF) radio, and/or other communication links. In some implementations, the aircraft 100 may act as a relay between the ATC 106 and the GCS 102. For example, the aircraft 100 may receive communications from the ATC 106 and then transmit the communications to the GCS 102. Similarly, the aircraft 100 may receive communications from the GCS 102 and send the communications to the ATC 106. The aircraft 100 may communicate voice/data between the ATC 106 and GCS 102 using a variety of communication channels described herein. In one implementation, the aircraft 100 may send/receive digital voice data to/from the GCS 102. In this implementation, the aircraft 100 may convert digital voice data to radio voice communication with the ATC 106 (e.g., via VHF radio). In some implementations, the aircraft 100 and/or GCS 102 may translate voice radio to text.

In some implementations, the origin airport 108-1 and/or the destination airport 108-2 may include a ground crew that interacts with the aircraft 100. The ground crew at the origin and destination airports 108 may be referred to as an "origin ground crew" and a "destination ground crew," respectively. The ground crews may provide a variety of services at the airports 108 including, but not limited to, towing the aircraft 100 to/from the hangar, fueling the aircraft 100, and loading/unloading the aircraft payload. The ground crew may have ground crew computing devices 110-1, 110-2 (e.g., smartphones/tablets) that communicate with GCS 102, the aircraft 100, a base station 104, and/or ATC 106. The ground crew may receive requests/commands from various parties via the ground crew computing devices 110. The ground crew may interact with the ground crew computing devices 110 to complete tasks. The ground crew may also acknowledge requests and confirm completions of the requests/commands via the ground crew computing devices 110.

Although the aircraft 100 is illustrated herein as a fixed wing aircraft, the techniques of the present disclosure may be implemented in other types of aircraft, such as rotorcraft, vertical takeoff and landing aircraft (VTOL), and hybrid configurations, such as tilt-wing aircraft and electrical vertical takeoff and landing aircraft (eVTOL). Although the aircraft 100 may be an unmanned aircraft, in some implementations, the aircraft may be an optionally piloted aircraft. Although the airports 108 may include runways 112-1, 112-2 (e.g., paved or unpaved), other touchdown areas may include, but are not limited to, a heliport, a vertiport, a seaport, a moving touchdown area (e.g., an aircraft carrier), and unprepared landing areas, such as emergency landing sites and package delivery sites.

Although a GCS 102 is described herein as being responsible for a single flight, a single GCS may be responsible for multiple aircraft (e.g., multiple different flights). Although a single GCS may be used for a single flight, in some implementations, the aircraft 100 may communicate with more than one GCS during flight. For example, a first GCS (e.g., at the origin airport) may hand off the aircraft to a second GCS (e.g., at the destination airport or elsewhere).

Figure 1B:
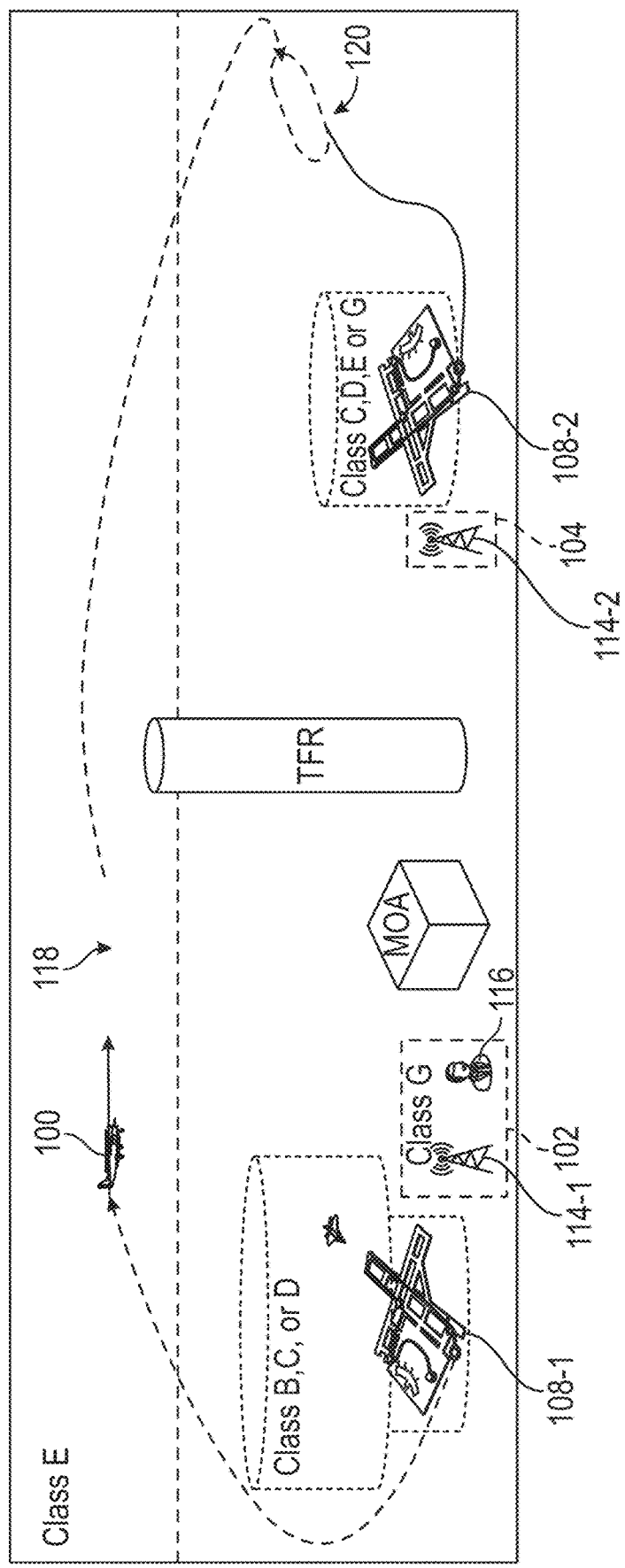
FIG. 1B illustrates another example environment that includes an origin airport, aircraft, GCS, base stations, and a destination airport.

FIG. 1B illustrates another example environment that includes an origin airport 108-1, an aircraft 100, a GCS 102, a base station 104, and a destination airport 108-2. In FIG.

1B, the aircraft 100 departs from the origin airport 108-1 in communication with radio 1 114-1 (e.g., at GCS 102). Radio 1 114-1 may be a radio at the GCS 102 that has a line of sight connection with the aircraft 100 at the origin airport 108-1 and during a portion of the flight to the destination airport 108-2. In FIG. 1B, the GCS 102 may be located near enough to the origin airport 108-1 to maintain VHF voice communications with ATC at the origin airport 108-1. A human operator 116 may be located at the GCS 102.

During flight, a handoff occurs between radio 1 114-1 and radio 2 114-2 (e.g., indicated at 118). Radio 2 114-2 (e.g., at a base station 104) may be a radio at/near the destination airport 108-2 that develops a line of sight connection with the aircraft 100 as the aircraft 100 approaches the destination airport 108-2. The GCS 102 may communicate with radio 2 114-2 via one or more communication links, such as a wired Internet connection or cellular connection. In some implementations, the handoff between radio 1 114-1 and radio 2 114-2 may include a period of time during which the aircraft can simultaneously communicate with radio 1 114-1 and radio 2 114-2. In some implementations, the aircraft 100 may lose communication with radio 1 114-1 for a period of time prior to establishing communication with radio 2 114-2. In these implementations, the aircraft 100 may be configured to expect a loss in communication for a period of time.

The flight plan in FIG. 1B may include a variety of different airspaces, such as class B, C, D, E, and/or G airspaces. The aircraft flight plan may also be configured to avoid or properly enter some airspaces, such as a military operation area (MOA) and a temporary flight restriction (TFR) airspace. Note that prior to landing at the destination airport 108-2, the aircraft 100 executes a holding pattern 120 (e.g., an ATC hold). The aircraft 100 described herein may initiate a holding pattern in a variety of scenarios, such as during loss of communications and/or in response to ATC/GCS instructions. During flight, the aircraft 100 (e.g., an avoidance system) may detect and avoid other aircraft 122, terrain (e.g., mountains), and structures (e.g., buildings, powerlines, etc.).

Figure 1C:
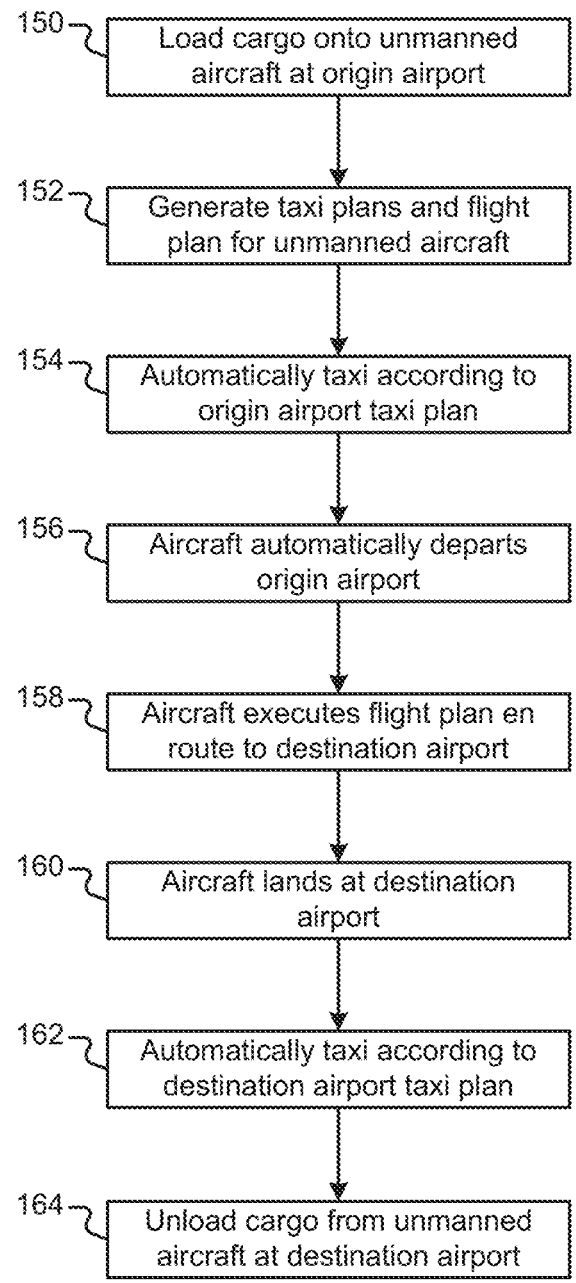
FIG. 1C is a method that describes example operations associated with the environment of FIG. 1A.

FIG. 1C is a method that describes example operations associated with the parties of FIG. 1A. In block 150, the origin ground crew loads cargo onto the aircraft 100 (e.g., an unmanned cargo aircraft). In block 152, the GCS 102 and/or the aircraft 100 may generate an origin airport taxi plan, a destination airport taxi plan, and a flight plan. In block 154, the aircraft 100 may automatically taxi according to the origin airport taxi plan. In block 156, the aircraft 100 may initiate the flight plan and takeoff from the origin airport 108-1. In blocks 158-160, the aircraft 100 executes the flight plan en route to the destination airport 108-2 and lands at the destination airport 108-2. In block 162, the aircraft 100 may automatically taxi according to the destination airport taxi plan and come to a stop. In block 164, the destination ground crew unloads cargo from the aircraft.

In the method of FIG. 1C, the aircraft 100 executes initial taxi plans and an initial flight plan without modification. Although the aircraft 100 may execute initial plans without modification, the GCS 102 and aircraft 100 described herein may modify taxi plans and flight plans in response to a variety of different factors, such as ATC instructions, ground/air traffic, and/or other contingency scenarios described herein.

The aircraft 100 and the GCS 102 may encounter and detect one or more contingency scenarios when executing taxi plans and flight plans. Example contingency scenarios may include, but are not limited to, degradation/loss of communication, aircraft system/component failures, and other errors that may cause deviation from the planned path. The aircraft 100 and/or the GCS 102 may include contingency systems 200, 500 that may detect contingency scenarios and implement contingency management operations (e.g., generate contingency plans) in response to detecting the various contingency scenarios. The contingency systems 200, 500 may include contingency data/operations (e.g., in memory) that are used by the contingency systems 200, 500 to implement the contingency detection and management operations described herein.

Figure 13:
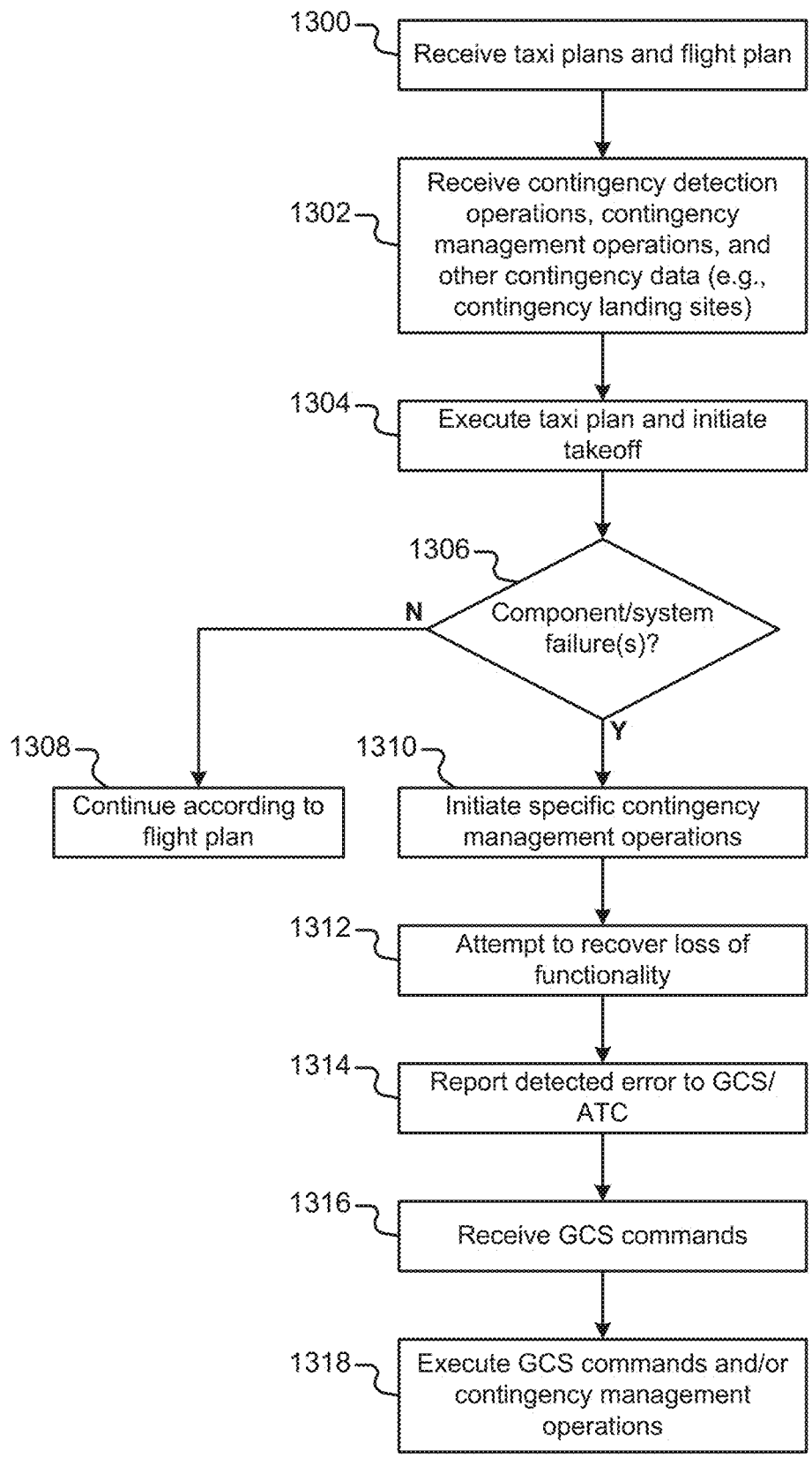
FIG. 13 illustrates example operations for an aircraft that may detect and respond to component/system failures.
Figure 14:
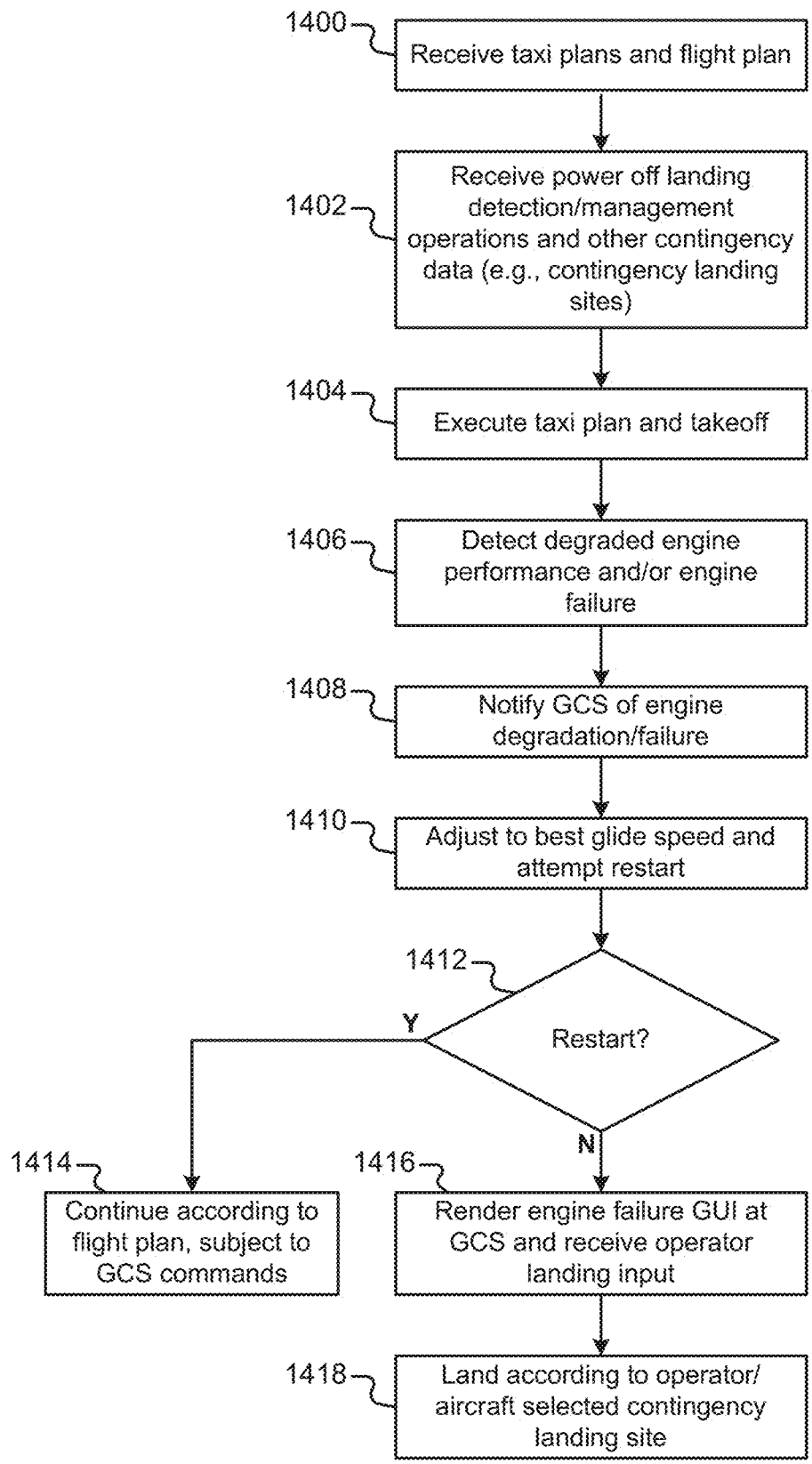
FIG. 14 is a flow diagram that illustrates example operations that an aircraft and/or GCS may implement in the event of engine failure.

FIGS. 2-15C illustrate example features of the aircraft 100, GCS 102, base stations 104, and other parties that may implement the systems of the present disclosure. FIGS. 2-4C illustrate example features of an unmanned aircraft 100. FIGS. 5-6D illustrate example features of a GCS 102. FIGS. 7A-8C illustrate example flow diagrams for operating an unmanned aircraft 100. FIGS. 9-12 illustrate example methods for managing lost communications during different phases of flight. FIGS. 13-14 illustrate example methods for managing system and component failures/errors, such as navigation system failures, air data system failures, and engine degradation/failure. FIGS. 15A-15C illustrate example responsibilities associated with different systems/operators.

Figure 2:
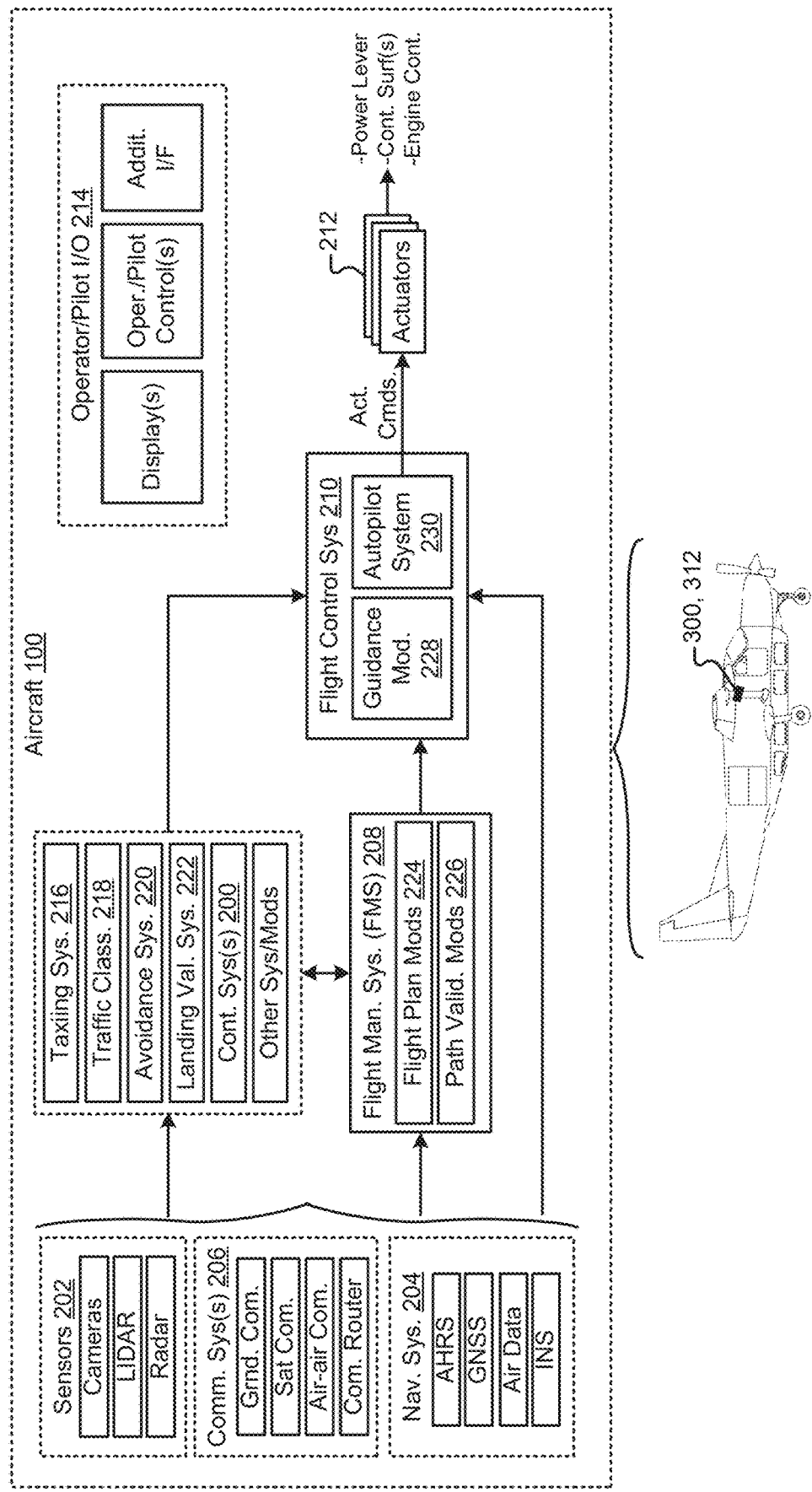
FIG. 2 is a functional block diagram of an example aircraft.

FIG. 2 illustrates a functional block diagram of an example aircraft 100 (e.g., an unmanned aircraft). The aircraft 100 includes: 1) sensors 202 (e.g., cameras, light detection and ranging systems, radar, etc.), 2) navigation systems 204, 3) communication systems 206, 4) a flight management system 208 (FMS 208), 5) a flight control system 210, and 6) actuators 212. In some implementations, the aircraft may include operator/pilot input/output devices (I/O) 214. Although the aircraft 100 may include operator/pilot I/O 214 in some implementations, the aircraft 100 may be operated as an unmanned aircraft (e.g., an unmanned cargo aircraft) without operator/pilot I/O 214.

The aircraft 100 may also include a plurality of additional systems that provide additional unmanned aircraft functionality described herein. For example, the aircraft 100 may include a taxiing system 216, a traffic classifier system 218, an avoidance system 220, a landing validation system 222, one or more contingency systems 200, and other systems/modules that provide additional functionality described herein.

The systems, modules, and other components included in the aircraft 100 and GCS 102 described herein may be implemented by hardware/software components (e.g., one or more computing devices) that provide the described functionality. In some implementations, the various hardware components (e.g., electrical and/or mechanical hardware components) and software components may be retrofitted onto an existing aircraft in order to provide the unmanned aircraft functionality. Additionally, or alternatively, the various hardware/software components may be integrated into the aircraft during manufacture. The functional block diagrams illustrated herein are meant to represent example functionality associated with the aircraft 100, GCS 102, and other systems described herein. As such, the aircraft 100, GCS 102, and other systems may be implemented in a variety of different ways with different hardware/software configurations.

The aircraft may include a navigation system 204 that generates navigation data. The navigation data may indicate the location, altitude, velocity, heading, and attitude of the aircraft 100. The navigation system 204 may include a Global Navigation Satellite System (GNSS) receiver that determines the latitude and longitude of the aircraft 100. For example, GNSS may include a global positioning system (GPS) receiver, a global navigation satellite system (GLONASS) receiver, a BeiDou receiver, a Galileo receiver, and/or another receiver.

In some implementations, the navigation system 204 may include an inertial navigation system (INS) that may include an inertial measurement unit (IMU) that provides rotational orientation data (e.g., attitude data) including pitch, roll, yaw, and attitude rate data (e.g., pitch rate, roll rate, and yaw rate). In some implementations, the navigation system 204 may include an attitude and heading reference system (AHRS) that may provide attitude and heading data for the aircraft 100.

The navigation system 204 may include an air data system (e.g., a Pitot-static tube, air data computer, etc.) that may provide airspeed, angle of attack, sideslip angle, altitude, and altitude rate information. The navigation system 204 may include a radar altimeter and/or a laser altimeter to provide Above Ground Level (AGL) altitude information. In some implementations, the navigation system 204 may include an instrument landing system (ILS). In some implementations, the navigation system 204 may also include other features, such as differential GPS, Real-Time Kinematics (RTK) GPS, and/or a ground-based augmentation system for aircraft landing (GBAS).

The aircraft 100 may include a plurality of sensors 202 that generate sensor data, such as sensor data that can be used to acquire images and detect other aircraft 122 and objects while taxiing/flying. For example, the aircraft 100 may include one or more radar systems, one or more electro-optical (E/O) cameras, one or more infrared (IR) cameras, and/or light detection and ranging systems (LIDAR). The radar systems and cameras may detect other aircraft (e.g., while en route). Additionally, the sensors 202 (e.g., cameras and LIDAR) may determine whether the runway is clear when approaching for a landing.

The aircraft 100 may include one or more communication systems 206. The communication systems 206 may include a plurality of different communication technologies that provide for a plurality of different types of communication links described herein. For example, the one or more communication systems may include one or more radios and other respective hardware/software configured to provide communications via the specified communication link.

In some implementations, the aircraft 100 may include one or more satellite communication systems that send/receive data to/from a satellite communication network. Example satellite communication systems may communicate via Inmarsat satellite networks and Iridium satellite networks.

In some implementations, the aircraft 100 may include one or more communication systems that communicate with ground-based parties. For example, the aircraft 100 may include a line of sight communication system that includes a radio that may communicate with ground-based line of sight systems (e.g., ground-based line of sight radios). The line of sight communication system may provide a data link to the ground-based line of sight system. In some implementations, line of sight communication systems may communicate for a distance of tens of miles (e.g., 50 miles or greater). An example line of sight system may include a control non-payload communication (CNPC) system for unmanned aircrafts. In some implementations, the aircraft 100 may communicate with GCS 102 and/or the base stations 104 using a line of sight communication system.

In some implementations, the aircraft 100 may include one or more cellular communication systems (e.g., cellular radios and associated hardware/software). A cellular communication system may be configured to communicate with a ground based cellular network. Example cellular networks may include, but are not limited to, 3G networks, 4G networks, and 5G networks.

In some implementations, the aircraft 100 may include a VHF radio communication system. The VHF radio communication system may communicate with ATC 106. In some implementations, the VHF radio may relay information. For example, the GCS 102 may communicate with the aircraft 100 via VHF radio, which is then transmitted via VHF radio to the ATC 106. As another example, the aircraft VHF radio may relay communications from the ATC 106 to the GCS 102. In some implementations, the aircraft 100 may receive digital data from a communication link. The aircraft 100 may translate the digital data for transmission via the VHF radio. For example, the aircraft 100 may receive digital voice data from GCS 102 (e.g., via a base station 104) and generate a VHF radio voice transmission to the ATC 106. Similarly, the aircraft 100 may receive VHF voice communications from the ATC 106, generate digital voice data, and send the digital voice data to the GCS 102 via a base station 104. In some implementations, a voice connection (e.g., ATC communication over radio VHF) may be converted to text for processing at the aircraft 100 and/or ATC 106.

In some implementations, the aircraft 100 may include one or more transponders (e.g., Mode C, Mode S, etc.). Example transponders may include transponders that transmit ADS-B data and transmit on the 1090 and 978 MHz bands.

In some implementations, the aircraft 100 may include one or more air-to-air communication systems, such as VHF radio, one or more traffic collision avoidance systems (e.g., TCAS I or TCAS II), high frequency (HF) radio, and satellite communication telephones. The aircraft 100 may relay any of the communications described herein to other aircraft 122, base stations 104, the GCS 102, and/or ATC 106.

In some implementations, the communication systems 206 can receive data from multiple communication links at the same time. In some implementations, the aircraft 100 may include a communication router that monitors the communication links and selects the communication links used for various communications. The communication router may include link monitoring hardware/software that indicates the strength of the links. In scenarios where multiple communication links are available (e.g., satellite, line of sight, and/or cellular), the communication router may select one or more of the available communication links for specific communications (e.g., command and control communications and/or telemetry communications). For example, a communication router may be configured to select the best link(s) (e.g., fastest, strongest, and/or most reliable links) for command and control (C2) communications. As described herein, the GCS 102 may also include a communication router 502 that performs similar functionality. Aircraft computing systems may receive and transmit data via the selected communication link(s).

The aircraft communication systems 206 may form a plurality of communication links with different parties, such as one or more GCSs, one or more base stations, one or more ATCs, other aircraft, and other parties. In general, the aircraft 100 may communicate with any one of the parties described herein using one or more of the described communication systems. For example, the aircraft 100 may send/receive data to/from the GCS 102 using one or more satellite communication links, one or more cellular links, and/or one or more line of sight links. As another example, the aircraft 100 may send/receive data to/from a base station 104 using one or more satellite communication links, one or more cellular links, and/or one or more line of sight links. As another example, the aircraft 100 may communicate with ATC 106 using VHF radio relay and/or via transponder.

The aircraft communication systems 206 may transmit/receive a variety of types of data described herein. The types of communications may vary, depending on the party communicating with the aircraft 100. For example, the aircraft 100 may send/receive data to/from the GCS 102. The data communicated between the aircraft 100 and the GCS 102 may be categorized as command and control data ("C2 data"). A communication link used to communicate C2 data may be referred to as a "C2 link." The aircraft communication systems 206 may implement one or more C2 links at the same time. For example, the aircraft 100 may include a satellite C2 link, a line of sight C2 link, and/or a cellular C2 link, each of which may be active at the same time or at different times (e.g., during different phases of flight).

The aircraft communication systems 206 may include one or more communication links in addition to C2 links. The additional links may be referred to as "telemetry links." The telemetry links may transmit/receive telemetry data. The telemetry links may use one or more additional communication systems (e.g., radios, hardware, software, etc.) in order to conserve maximum communication capabilities (e.g., maximum bandwidth) for the C2 links. Example telemetry data may include any data transmitted from the aircraft 100 that is not for managing flight. Telemetry data may vary, depending on the mission. For example, telemetry data may include survey data for an aircraft survey mission.

A variety of types of data may be communicated between the aircraft 100 and the GCS 102 directly or via a base station 104. The data may be sent through the C2 link or other links (e.g., telemetry links). Example data described herein includes taxi plans, flight plans, modifications to taxi/flight plans, contingency detection parameters, contingency management operations, other contingency data (e.g., contingency airports or other landing sites), and handshake protocols. Additional data may include video data, such as video streams during taxiing, flight, and/or landing.

Example C2 downlink data sent from the aircraft 100 to the GCS 102 may include, but is not limited to health and status data, aircraft state information, link status data, lost communication operations, detection and avoidance data, aircraft systems health and status data, VHF voice relay data, radio handoff data, and weather information. Example health and status data may include, but is not limited to, temperature of the servos, engine temperatures, torque of the servos and engine, fuel quantity, engine rotations per minute (RPM), INS status (including GPS/RTK status), and fault data associated with sensors, actuators, and computational latency. Example aircraft state information may include, but is not limited to, velocity, altitude, attitude, latitude, longitude, AGL, servo positions, servo commands, and acceleration. Example detection and avoidance data may include, but is not limited to, health status, control bands, and intruder tracks. Additional aircraft health status may indicate the health status of the electrical systems, fuel systems, and/or avionics systems.

Example C2 uplink data that may be sent from the GCS 102 to the aircraft 100 may include, but is not limited to, mode switching data, new mission data (e.g., new runway, taxi data, and/or gate information), takeoff and landing commands, taxi stop/proceed commands, GCS operator voice, vehicle system state change commands, link status, lost communications operations, radio hand off information, and weather information. Example mode switching data may be associated with the mission, heading, and/or loitering. Example vehicle system state change commands may include commands for lighting control, power distribution control, radio frequency changes, and/or transponder code changes.

The C2 link may comply with the DO-362 for electronics security. The communication protocol between the UA and GCS may be fully encrypted. This may be accomplished through an end-to-end layer 3 encryption established via a VPN tunnel (IPSec, AES-128 GCM) between the Pilot/Operator station (PS) and the aircraft gateway to provide authentication, data integrity, data confidentiality, and access control regardless of underlying communication medium. An example C2 radio link may include a COLLINS CNPC-5000E radio. The aircraft and/or GCS may include one or more omni-directional antennae and/or directional antennae. The system may also include a Long-Term Evolution (LTE) connection that may be used for RTK GPS corrections and/or as a high latency backup link to send high level commands to the aircraft in the event of the loss of the C2 link.

A variety of types of data transfer between the aircraft 100 and other parties is described herein. The data transferred via the C2 and telemetry links described herein is only example data that is communicated via example links. As such, the data communicated between the aircraft and other parties may vary, depending on the implementation of the aircraft, GCS, base stations, and other parties.

The aircraft may include a flight management system (FMS) 208 that may receive and/or generate one or more flight plan data structures (i.e., flight plan data) that the aircraft 100 may use for navigation. A flight plan data structure may include a sequence of waypoints that each indicate a target location for the aircraft 100 over time. A waypoint may indicate a three-dimensional location in space, such as a latitude, longitude, and altitude (e.g., in meters). Each of the waypoints in the flight plan data structure may also be associated with additional waypoint data, such as a waypoint time (e.g., a target time of arrival at the waypoint) and/or a waypoint speed (e.g., a target airspeed in knots or kilometers per hour). In some implementations, a flight plan data structure may include other trajectory definitions, such as trajectories defined by splines (e.g., instead of discrete waypoints) and/or a Dubins path (e.g., a combination of a straight line and circle arcs). In some implementations, the flight plan data structure may include additional flight parameters, such as a desired flap position. The flight plan data structure may be generated for different phases of flight, such as departure, climb, cruise, descent, approach, and missed approach. In some implementations, a flight plan data structure may specify a flight pattern (e.g., near an airport, landing, departing, etc.). The flight plan data structure may be generated in a variety of ways. In some implementations, the flight plan data structure may be manually constructed. In some implementations, the flight plan data structure may be automatically generated at the GCS 102 and/or on the aircraft 100 (e.g., by the flight planning system/modules).

In some implementations, a flight plan may be associated with geofence data that defines a volume of airspace around the flight plan. The geofence boundary around the flight plan may define a tolerance volume in which the aircraft 100 may travel during flight. In some cases, breaching the geofence boundary during flight may indicate that the aircraft systems/components are experiencing errors/failures. In some cases, breaching the geofence boundary may be the result of adverse weather (e.g., high wind speeds). The contingency systems 200, 500 of the present disclosure may detect and manage scenarios in which the aircraft 100 breaches a geofence boundary.

The GCS 102 and/or aircraft 100 (e.g., FMS 208) may include flight planning systems/modules 504, 224 that generate flight plans. For example, the flight planning modules 224 and/or system 504 may generate a flight plan data structure (a "flight plan") that the aircraft 100 may use to navigate in the vicinity of an airport. The flight plan may mimic a human-generated flight path in the vicinity of controlled and uncontrolled airports. For example, the generated flight plan may abide by the same set of rules that govern manned air traffic around an airport. The generated flight plan may also follow the expectations of air traffic controllers and other pilots, while providing flexibility for the aircraft 100 to make decisions and avoid obstacles, weather, and other traffic. The generated flight plan may also allow an aircraft to adjust speed to meet required times of arrival at waypoints along the way.

The flight planning modules/system 224, 504 may generate a landing pattern for landing at a destination airport 108-2 or other contingency airport. For example, the flight planning modules/system 224, 504 may select a runway (or other surface) and a left or right traffic pattern (e.g., for landing). The flight planning modules/system 224, 504 may also select a sequence of additional waypoints/legs to follow after the starting waypoint. The flight planning modules/system 224, 504 may generate the landing pattern based on the selected runway, selected left/right pattern, and the selected waypoint/leg sequence. For example, the flight planning modules/system 224, 504 may generate constraint equations for each waypoint, generate an objective function for maximizing/minimizing various quantities (e.g., altitude, speed, and/or timing), and then solve the objective function to determine the waypoint variable values (e.g., waypoint locations). In some implementations, the flight planning modules/system 224, 504 may select the runway based on traffic classification data indicating which runway is being used for landing and how many aircraft are using the runway for landing and/or takeoff.

In some implementations, the FMS 208 and/or flight planning system 504 may include a path validator module 226. The path validator module 226 may determine whether the flight plan generated by the FMS 208 and/or flight planning system 504 intrudes on any inappropriate airspace, intersects with any terrain (e.g., mountains), and/or intersects with any other structures (e.g., buildings, power lines, etc.). In the case the path validator module 226 determines that the flight plan intrudes on inappropriate airspace and/or intersects with terrain/structures, the FMS 208 and/or flight planning system 504 may recalculate the flight plan.

In some implementations, the GCS 102 may include components (e.g., operator I/O) that generate an interface for the flight planning system 504. For example, the GCS 102 may include displays that display airport map and path planning GUIs described herein. As another example, the GCS 102 may include other I/O for providing an operator with path planning information and receiving path planning inputs.

The aircraft 100 includes a flight control system 210 that generates actuator commands based on a taxi plan or a flight plan. The flight control system 210 may include a guidance module 228 and an autopilot system 230. The flight control system 210 illustrated and described herein is only an example flight control system 210. As such, other flight control systems 210 including additional/alternative components may be implemented according to the techniques of the present disclosure.

The flight control system 210 may generate control commands that control the aircraft 100. For example, the flight control system 210 may generate commands that control the actuators 212 and the engines (e.g., via an engine controller). The flight control system 210 may control the aircraft 100 according to commands generated by the FMS 208, such as commands generated based on flight plan data or taxi plan data. The flight control system 210 may also control the aircraft according to commands and/or updated flight/taxi plans received from the GCS 102 via the FMS 208. For example, a remote operator may input commands and/or updated flight/taxi plans at the GCS 102 and upload the commands/plans to the aircraft 100 for implementation by the FMS 208 and flight control system 210. Accordingly, the flight control system 210 may control the aircraft 100 according to flight/taxi plan data and commands that are generated remotely by the GCS 102 and/or locally by the FMS 208.

In some implementations, the flight control system 210 may include a guidance module 228. In some implementations, the guidance module 228 may receive the flight plan data structure and additional information regarding the state of the aircraft 100, such as a current location (e.g., a latitude/longitude/altitude), velocity, and aircraft attitude information. Based on the received information, the guidance module 228 may generate autopilot commands for the flight control system 210. Example autopilot commands may include, but are not limited to, a heading command, a desired airspeed command, a desired altitude command, and a roll command.

The flight control system 210 may include an autopilot system 230 that controls the aircraft 100 based on autopilot commands received from the guidance module 228. For example, the autopilot system 230 may output control signals/commands that control actuators 212 (e.g., power lever actuators for one or more engines, elevator actuators, brake actuators, steering actuators, etc.). In some implementations, the aircraft 100 may include an engine controller that controls one or more engines, such as turboprop engines or other engine types. The engine controller may control the engine(s) based on received engine commands, such as a power lever position command. For example, the engine controller may control fuel and other engine parameters to control the engines according to the received engine commands. In some implementations, the engine controller may include a full authority digital engine control (FADEC) that controls the engines. Example engines may include, but are not limited to, a piston engine, turboprop, turbofan, turbojet, jet, and turboshaft. In some implementations, the aircraft 100 may include one or more electric motors (e.g., fixed, tilting, etc.). In some implementations, the aircraft 100 may include a propeller system.

The autopilot system 230 may receive autopilot commands from the FMS 208 and/or the operator controls at the GCS 102. The autopilot system 230 may operate in a plurality of different modes. In one example mode, the autopilot system 230 receives data (e.g., a taxi plan and/or a flight plan) from the FMS 208 and the autopilot system 230 controls the aircraft 100 according to the data received from the FMS 208. In another mode, a remote operator may use remote operator controls (e.g., on a control panel at the GCS 102) to generate control inputs for the autopilot system 230.

The aircraft 100 may include a plurality of control surfaces. Example control surfaces may include, but are not limited to, ailerons, tabs, flaps, rudders, elevators, stabilizers, spoilers, elevons, elerudders, ruddervators, flaperons, landing gears, and brakes for fixed-wing aircraft. Rotorcraft may include other controls/surfaces (e.g., rotor collective, cyclic, and tail rotor). The aircraft 100 can include actuators/linkages that control the control surfaces based on the commands generated by the remote operator controls and/or the autopilot system 230. The actuators and linkages may vary, depending on the type of aircraft.

In some implementations, the aircraft 100 may include interfaces for an onboard pilot/operator. The GCS 102 may include similar interfaces described herein. The aircraft and GCS interfaces may be referred to herein as operator input/output (I/O) devices 214, 506 and/or HMI. The operator I/O 214, 506 may include operator controls, one or more displays, and additional interfaces. The operator controls include devices used by the remote/onboard operator to control the aircraft 100, such as a flight yoke, power lever, manual buttons/switches, and other controls. The displays can display one or more GUIs. Additional interfaces may include audio interfaces (e.g., speakers, headphones, microphones, etc.), haptic feedback, keyboards, mice, and other I/O devices, such as readouts and gauges. In some implementations, an unmanned aircraft may not include operator I/O 214.

The aircraft 100 may include a plurality of systems directed to providing unmanned flight. The systems may include a taxiing system 216, a traffic classifier system 218, an avoidance system 220, a landing validation system 222, one or more contingency systems 200, and other systems/modules. The GCS 102 may include GCS-based components of the various systems (e.g., 500, 504, 510, 512, 514 in FIG. 5). In some implementations, portions of the systems may be implemented on the aircraft 100. In some implementations, portions of the systems may be implemented at the GCS 102. The extent to which the systems are implemented on the aircraft 100 and/or GCS 102 may vary, depending on the implementation. Additionally, the systems/modules illustrated herein may be implemented in one or more different locations in the aircraft/GCS. For example, the systems 200, 216, 218, 220, 222, 224, and 226 may be implemented in one or more locations on the aircraft 100, such as within an FMS, flight control system, and/or other systems.

The GCS 102 may include systems/devices (e.g., a GCS taxiing system 510) that generate a taxi path plan ("taxi plan") for the aircraft 100. The aircraft 100 may include an aircraft control system 210 (e.g., a taxiing system 216) that controls the aircraft 100 according to the generated taxi plan, such that the aircraft 100 may automatically traverse the generated taxi plan without additional operator intervention. In some implementations, the taxi plan may include a list of coordinates (e.g., latitude/longitude at the airport) and other data for the aircraft autopilot system 230 (e.g., auto-taxiing features of the autopilot system 230). In some implementations, the aircraft 100 may include a taxiing system 216 that generates a taxi plan.

An airport may have multiple possible paths between two points (e.g., latitude/longitude points), depending on airport topology. The taxiing system 510, 216 may find a path through different airport topologies based on ATC instructions and/or other path planning operations (e.g., a shortest path for non-towered airports). Example starting/destination locations for a taxiing plan may include, but are not limited to, a hangar, parking, other aircraft storage, cargo pickup/dropoff locations, and/or passenger pickup/dropoff locations.

Example input data used to generate a taxi plan may include, but is not limited to, a starting location of the aircraft, a starting orientation/heading for the aircraft, an airport map, ATC instructions, a destination location for the aircraft, and a destination orientation/heading for the aircraft. The airport map may be stored in a data store at the taxiing system 510, 216 and/or acquired from another data store that provides airport maps. In some implementations, the taxiing system 510, 216 may translate received maps into a proper format for use in generating a taxi plan. In some implementations, maps may include preset points from which a taxi plan is selected. In some implementations, points may be generated dynamically. If the airport includes an ATC, the ATC instructions may be received from the ATC. In some implementations, the ATC instructions may be manually entered by a human operator. In other implementations, the ATC instructions may be input via voice-to-text.

In some implementations, an airport map data structure may include point data structures (e.g., waypoint data structures) that define different locations in the airport. For example, airport point data structures may include point IDs and geometry information. In one example, airport point data structures may include a name, latitude, longitude, and altitude values. The taxiing system 510, 216 may generate taxi plans from one point in the airport map to another point. In some implementations, an airport map may be structed as a directed graph that includes edge data structures ("edges"). Edges may connect two points on the map and may specify stop points that belong to the edge. Edges may include associated data, such as membership data that indicates a location description that ties the map data to real world path names (e.g., instructed by the ATC). Example membership data may include a taxiway letter (e.g., L, A, F), a runway name (e.g., 32R, 01L), or a specified "non movement area" (NMA).

The taxiing system 510, 216 may generate the taxi plan based on ATC instructions and/or using other path planning algorithms, such as a shortest path algorithm (e.g., through airport map data). The remote operator may review the taxi plan (e.g., on a taxi plan GUI). In some implementations, the remote operator may modify the taxi plan and/or request a new taxi plan. The GCS 102 may send the taxi plan to the aircraft 100. The aircraft 100 (e.g., taxiing system 216) may execute the taxi plan by controlling the aircraft 100 according to the taxi plan.

The GCS taxiing system 510 may provide user interfaces that allow the operators to generate, review, modify, and monitor the airport maps and taxi plans. Example user interfaces may include GUIs including graphical elements, such as graphical representations for the maps, paths, and calculations described herein. Example GUIs may include GUIs that show map points and paths.

The aircraft taxiing system 216 may include taxi steering control that may actuate the nose wheel steering, rudder, and/or differential brakes to cause the aircraft 100 to track the waypoints. The aircraft taxiing system 216 may also include taxi speed control that may actuate the power lever and the brakes to cause the aircraft to track the speed setpoints and stop at the stop waypoints. In some implementations, the aircraft taxiing system 216 may implement detection and avoidance during taxiing. For example, the taxiing system 216 may detect and avoid other aircraft while taxiing based on sensor data (e.g., images, radar, LIDAR, etc.) and/or other data.

In some implementations, the aircraft/GCS may include a traffic classifier system 218 ("traffic classifier 218") that determines tracking data for surrounding aircraft. Tracking data for an aircraft may indicate the location, heading, and speed of the aircraft. In some implementations, the traffic classifier 218 may determine traffic classification data for each aircraft. Example traffic classification data may indicate whether an aircraft is in a specific traffic pattern (e.g., a landing pattern, takeoff pattern, or holding pattern) along with which leg of the traffic pattern (e.g., a downwind leg). Traffic classification data may also indicate a runway other aircraft are using to land.

The traffic classifier 218 may detect, track, and classify surrounding traffic as well as predict their behavior. The traffic classifier 218 may receive data that includes ADS-B data, TIS-B data, TCAS data, Mode C data, Mode S data, camera data, LIDAR data, radar data, and other traffic data. The traffic classifier 218 may output traffic classification data that includes tracking data that indicates a location and direction of other aircraft, along with additional data that characterizes the other aircraft. Traffic classification data can be used to select the runway, pattern plan, and to avoid other aircraft.

The traffic classifier 218 may receive data from various sensors that may be used to detect moving objects. LIDAR, radar, and cameras may provide target locations that are in a frame of reference relative the sensor itself. The target locations may then be geo-referenced in a global reference system using attitude, rate, velocity, and position information from an on-board INS coupled with a GNSS that may rely on a combination of GPS, BeiDou, Galileo, and GLONASS. The geo-registration may be performed using accurate timing to precisely determine the location and velocity of the targets. ADS-B and traffic information service—broadcast (TIS-B) data may provide target locations in a global frame of reference. Although the targets may be geo-referenced in a global reference, in some cases, the targets may be tracked in a relative reference frame.

The traffic classifier 218 may generate tracking data that may indicate the current location/velocity of aircraft in the vicinity of the airport. In some implementations, the tracking data may include the type of aircraft, such as an airplane, helicopter, or balloon. The type of aircraft may be determined based on camera imagery, radar signatures, and/or observed maneuvering capabilities. The traffic classifier 218 may also determine tracking data for aircraft using additional and/or alternative data, such as ground radar transmitted radio-frequency (RF) signals. The traffic classifier may combine tracking data from the different sources, such as tracking data from LIDAR data, radar data, camera data, etc. In some cases, some tracking data from different sources may be for the same one or more aircraft. In these cases, the traffic classifier 218 may combine (e.g., "fuse") tracking data from different sources for the same aircraft. The traffic classifier 218 may output final tracking data that includes tracking data from one or more sources for each aircraft in the vicinity of the airport.

The GCS 102 and/or aircraft 100 may implement a conflict avoidance system 512, 220 (hereinafter "avoidance system 512, 220") that assists the aircraft/operator in identifying and avoiding other aircraft. The aircraft 100 and/or the GCS 102 may implement the avoidance system 220, 512 in a variety of different ways. In some implementations, the aircraft may automatically avoid conflicts. In some implementations, the GCS 102 (e.g., a GCS computing system) may render an avoidance GUI that the remote operator may use to avoid conflicts.

The avoidance system 512, 220 may predict and detect conflicts between aircraft. In some cases, a conflict may be referred to as a "loss of separation." The avoidance system 512, 220 may also provide a remote operator with actionable visual/audio information in response to prediction/detection of the conflicts. For example, the avoidance GUIs may display actionable information to the pilot that helps the pilot avoid potential conflicts. The avoidance GUIs may also display actionable information that helps the pilot resolve a realized conflict (e.g., a current loss of separation). For example, the remote operator may interact with the remote I/O at the GCS 102 to perform a recommended resolution maneuver that will resolve/prevent conflicts. In some implementations, the avoidance system 220, 512 may automatically control the aircraft 100 to perform a resolution maneuver that resolves/prevents conflicts. For example, the avoidance system 220 may determine a resolution maneuver and engage the autopilot system 230 to perform the resolution maneuver.

The avoidance system 220, 512 may predict the trajectory of the aircraft 100 and other aircraft. The avoidance system 220, 512 may determine whether the other aircraft 122 will conflict with the ownship aircraft 100 based on the predicted trajectories. A conflict between the ownship aircraft 100 and another aircraft may refer to a scenario where the ownship aircraft 100 and the other aircraft come within less than a threshold distance from one another (e.g., violate a minimum safe distance). Although a collision may occur between two aircraft during a loss of separation, a conflict does not necessarily imply a scenario where there will be a collision between aircraft.

The avoidance system 220, 512 may predict whether there may be a future conflict with other aircraft, such as a future loss of separation due to a flight modification by the ownship aircraft 100 and/or the other aircraft 122. The avoidance system may also determine whether there is a realized conflict with other aircraft. Other aircraft that currently conflict with the ownship aircraft and/or may potentially conflict with the ownship aircraft within a period of time may be referred to herein as "intruder aircraft" or "intruders."

The avoidance system 220, 512 may determine one or more conflict zones in the airspace based on the ownship aircraft predicted/planned trajectory and the predicted trajectories of one or more intruders. The conflict zone may refer to a portion of airspace in which a conflict is occurring, or may occur, between the ownship aircraft 100 and one or more intruders. For example, the conflict zone may refer to a volume (e.g., a conflict volume) of airspace in which loss of separation is occurring, or may occur, between the ownship aircraft 100 and one or more intruders.

The avoidance system 220, 512 may use data from the navigation system 204, sensors 202, and communication systems 206 in order to determine the historic/current state of the ownship aircraft 100 and other aircraft 122. For example, the avoidance system 220, 512 may determine historic/current attitude, position, and/or velocity of the ownship aircraft 100 and other aircraft 122. Based on the state information, the avoidance system 220, 512 may determine the historic/current trajectory of the ownship aircraft 100 and other aircraft 122. The avoidance system 220, 512 may predict the trajectories of the ownship aircraft 100 and other aircraft 122 based on the historic/current state information (e.g., historic/current trajectories). The avoidance system 220, 512 may also determine whether there is a predicted/realized conflict and generate avoidance GUIs based on the predicted/realized conflict. Example avoidance GUI elements may include a rendered conflict zone and a rendered resolution maneuver indicator for resolving the potential/actual conflict.

In a specific implementation, the aircraft 100 may include an onboard avoidance system 220 that includes an ADS-B receiver, 2 airborne radars, four EO cameras, and a processing computer. The dual radars may cover a +/−110 degree horizontal and +/−40-degree vertical field-of-regard. The camera system may provide a +/−110 degree horizontal and +/−30-degree vertical field-of-view and may be used to validate and improve accuracy of tracks formed by ADS-B and radar. In some examples, the detection range for non-cooperative traffic may be approximately 1 nm. The avoidance system 220 may fuse data from radar, ADS-B, and vision, resulting in a comprehensive view of intruder aircraft. The DAIDALUS algorithm may be used to generate alerts, warnings, and guidance maneuvers from the fused tracks. Guidance maneuvers may be sent to the GCS 102 for operator response. Additionally, or alternatively, guidance maneuvers may be directly acted upon by the autopilot system 230 without additional input from the operator. The avoidance system 220, 512 may also integrate with the FAA's Obstacle Database and airspace database allowing a constant awareness of the class airspaces and ground-obstacles near the aircraft 100. The applicable information including traffic, alert and avoidance bands, and resolution maneuvers may be downlinked to the GCS 102 and displayed (e.g., in accordance with DO-365 and/or ASTM F38 WK62688).

A landing validation system 222, 514 ("validation system") may assist the remote operator in validating a landing location of the aircraft 100 during a runway approach. Additionally, or alternatively, the validation system 222, 514 may assist an automated landing system during landing of the aircraft. Features of the validation system 222, 514 may be implemented by the aircraft 100 and/or the GCS 102.

An example landing validation system using cameras is described herein. The aircraft 100 may include one or more cameras that acquire images of the runway during approach. Although cameras may be used for landing validation, additional/alternative techniques may be used to validate landing. For example, the validation system 222, 514 may be used along with other sensors and systems to validate a landing location, such as a GPS receiver, an instrument landing system (ILS), and/or other positioning systems.

The aircraft validation system 222 may process images acquired by the camera(s) and generate landing validation data that indicates a predicted landing location on the runway. In some implementations, the aircraft validation system 222 may include additional sensors that generate data (e.g., rotational orientation data) used to process the images and generate the landing validation data. For example, the aircraft validation system 222 may use orientation sensors (e.g., attitude sensors), such as an IMU or AHRS, to determine the rotational orientation of the aircraft 100 associated with the images. The landing validation data transmitted to the GCS 102 may include a variety of data, such as an image of the runway and a rendered predicted landing location 600 (referred to also as a "rendered landing zone") (e.g., see FIG. 6D). In some implementations, the landing validation data may include runway feature data indicating the location of various runway features in an image, such as a centerline 602, runway numbers, runway markers, and runway thresholds 604 (e.g., see FIG. 6D).

In some implementations, one or more aircraft cameras capture images while the aircraft 100 is approaching the runway at an approach angle (e.g., on glide slope). The images may include the runway on which the aircraft is landing. In some cases, the images may include a horizon and/or other surrounding natural features (e.g., lake, river, and/or ocean shores). Additionally, the images may include objects near the runway. The images may include a variety of detectable image features that may be detected and tracked from image to image. The aircraft validation system 222 processes the acquired images. For example, the aircraft validation system 222 may process a sequence of images to determine how features in the images have moved over time due to aircraft movement. The aircraft validation system 222 may determine the landing validation data (e.g., a predicted landing location/zone 600) based on the processed images.

The GCS validation system 514 may generate a landing validation interface ("validation interface") for the remote operator based on the received landing validation data (e.g., see FIG. 6D). For example, the GCS validation system 514 may render a GUI that indicates a predicted landing location/zone 600 at which the aircraft 100 may land. An example validation interface, referred to herein as a "landing validation GUI," is illustrated in FIG. 6D. The example landing validation GUI of FIG. 6D illustrates an example screenshot of a video/image stream that may be updated (e.g., in real-time) based on video, images, and/or landing validation data being received at the GCS 102 from the aircraft 100.

A remote operator in the GCS 102 may observe the landing validation GUI during the aircraft approach in order to visually verify that the aircraft is on the correct landing trajectory. In some implementations, the remote operator may provide an input indicating that the aircraft is cleared for landing (e.g., set a 'landing flag' at the aircraft indicating the landing should proceed). The operator may abort the landing in cases where the validation GUI indicates that the aircraft is on an incorrect trajectory, such as when the predicted landing zone is not centered on the runway at a proper landing location (e.g., a correct distance from the threshold). Although a remote operator may confirm and/or abort the landing, in some implementations, the aircraft 100 may decide to confirm/abort a landing (e.g., based on the predicted landing location/zone).

In some implementations, the aircraft 100 may be configured to perform a missed approach maneuver if other traffic interferes with the aircraft's ability to safely execute the approach or the landing cannot be made safely. Executing a missed approach maneuver may include executing a climb that is enough to remain clear of traffic, proceeding to a missed approach point, then proceeding on course as defined in a missed approach procedure (e.g., stored on the aircraft).

The aircraft 100 and/or GCS 102 may also include additional systems and modules, such as an ATC manager module and/or a weather manager module. The ATC manager module may acquire ATC information. For example, the ATC manager module may interact with and request clearances from the ATC via VHF, satellite, and/or a data connection. ATC traffic information may provide guidance and/or clearances for various operations in controlled airspace. The weather manager module may acquire the current and future weather information in the vicinity of the destination airport 108-2 as well as any other source for weather in between the current location and the destination airport 108-2. The weather information can be provided via satellite, Internet, VHF, onboard weather radar, and Flight Information Services—Broadcast (FIS-B). The information from these and other sources may be fused to provide a unified representation of wind, precipitation, visibility, etc. The aircraft 100 may also include modules for vehicle management, such as optimizing fuel and trajectory based on the performance of the aircraft 100.

The sensors 202 described herein may be included on the aircraft 100 in various locations in a variety of different ways. For example, the sensors 202 may be included in the aircraft structure (e.g., fabricated/integrated as part of the aircraft) and/or attached to the aircraft (e.g., permanently and/or removably attached). Example mounting locations may include, but are not limited to, underwing hardpoints and pylons, wingtip fairings, and/or wing strut mounts.

Figure 3A:
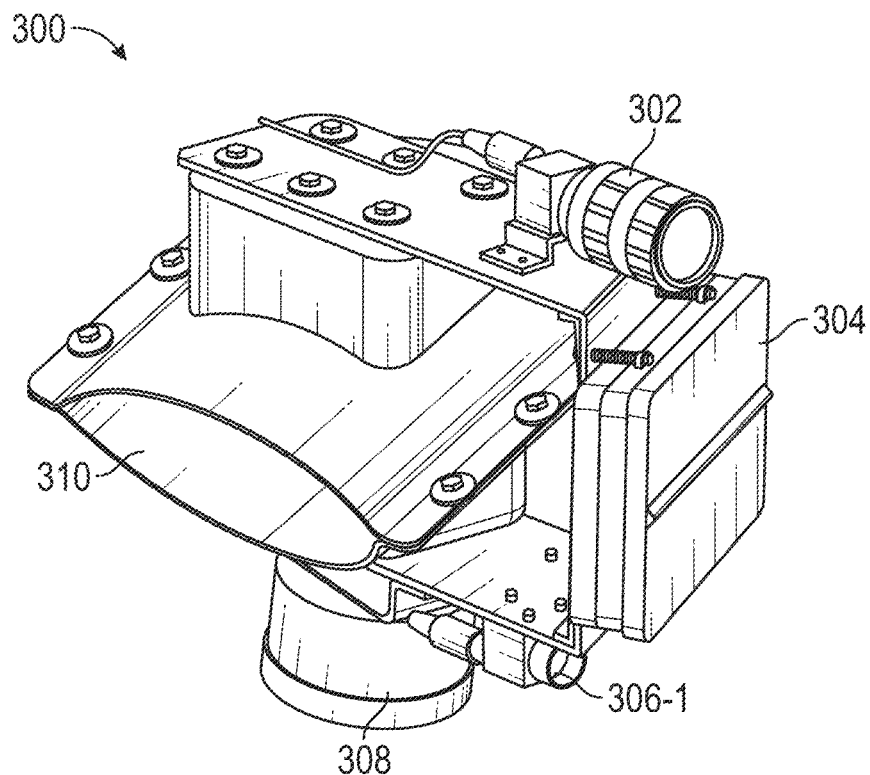
FIGS. 3A-3C illustrate example sensors that may be included on an aircraft.
Figure 3B:
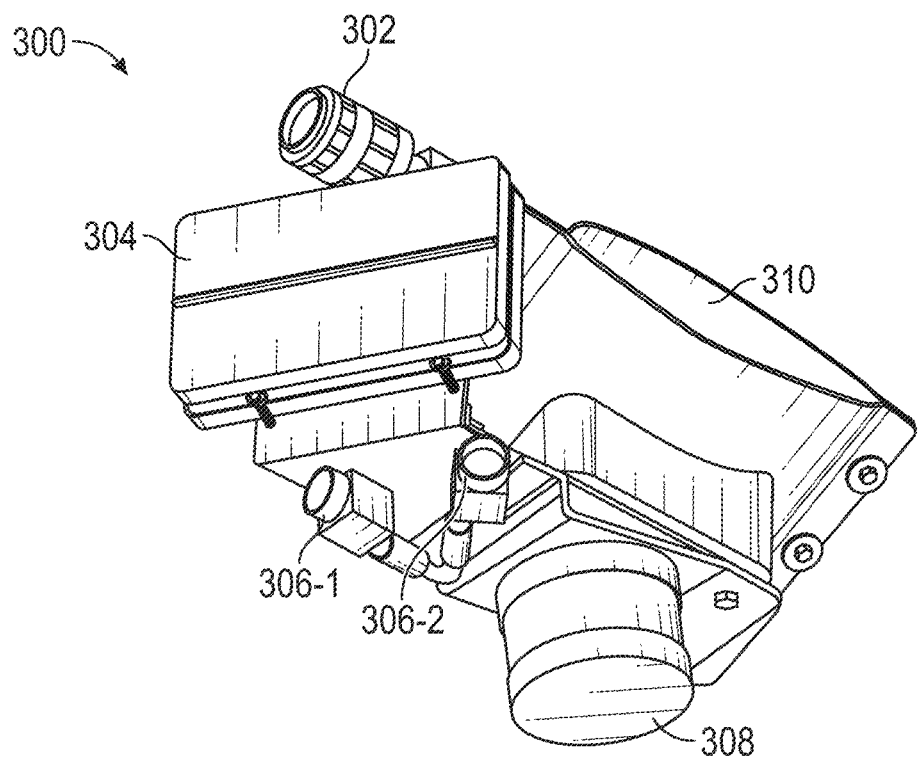
Figure 3C:
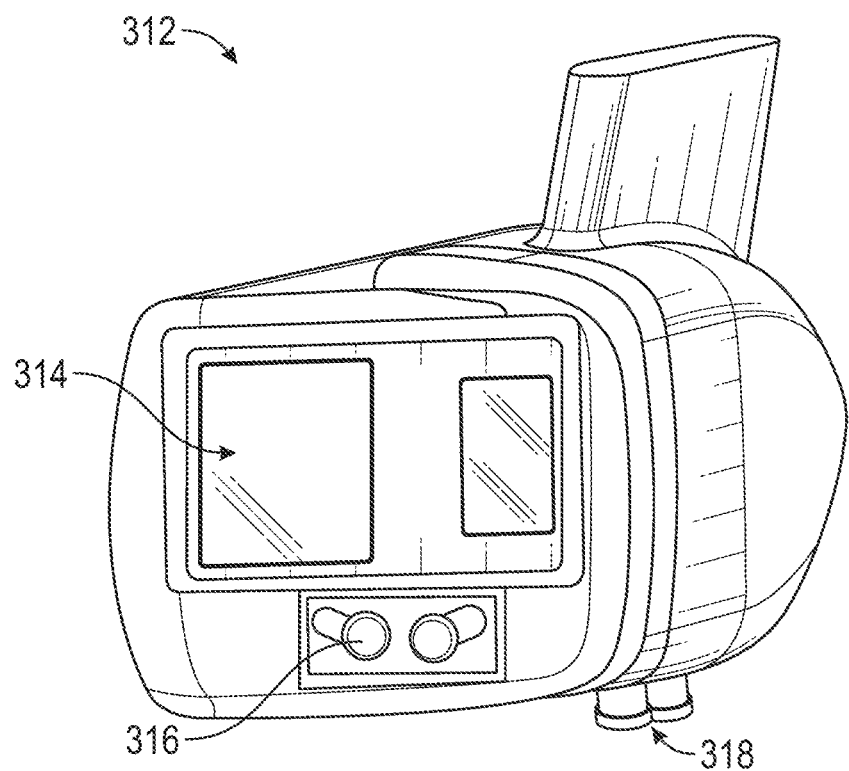
Figure 4A:
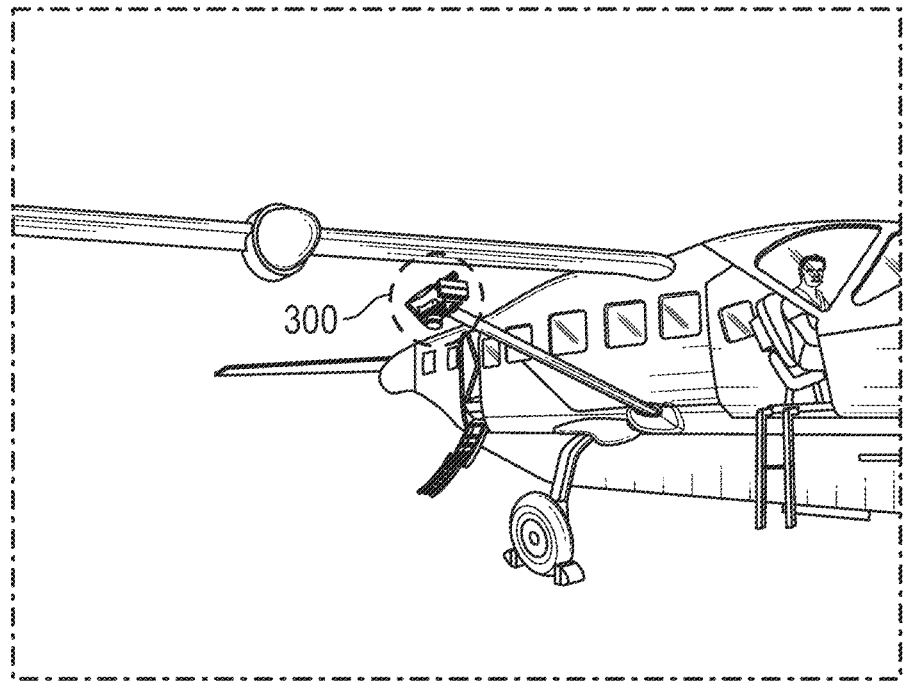
FIGS. 4A-4C illustrate example sensors included on an aircraft.
Figure 4B:
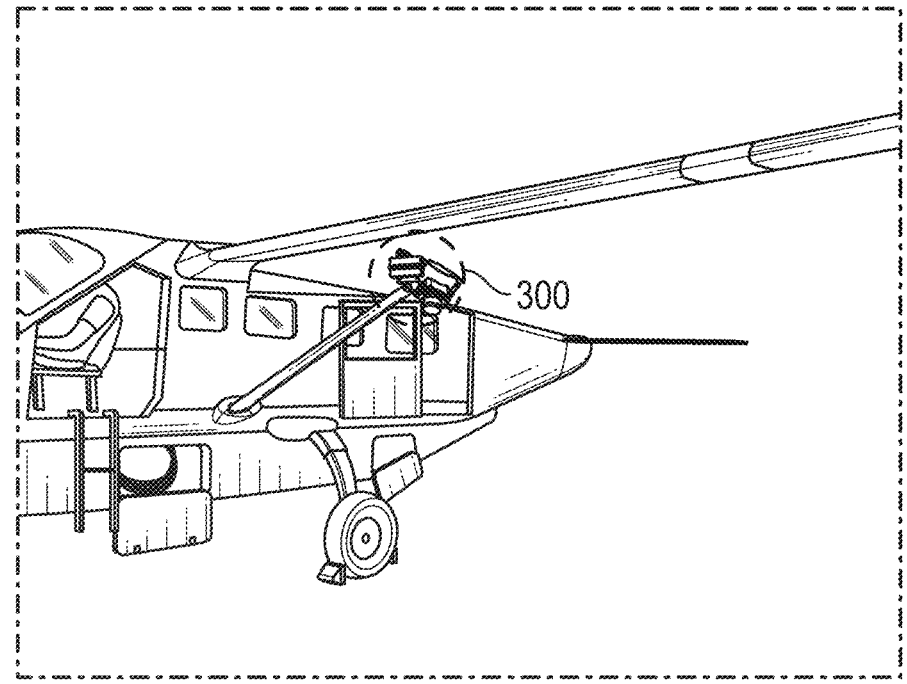
Figure 4C:
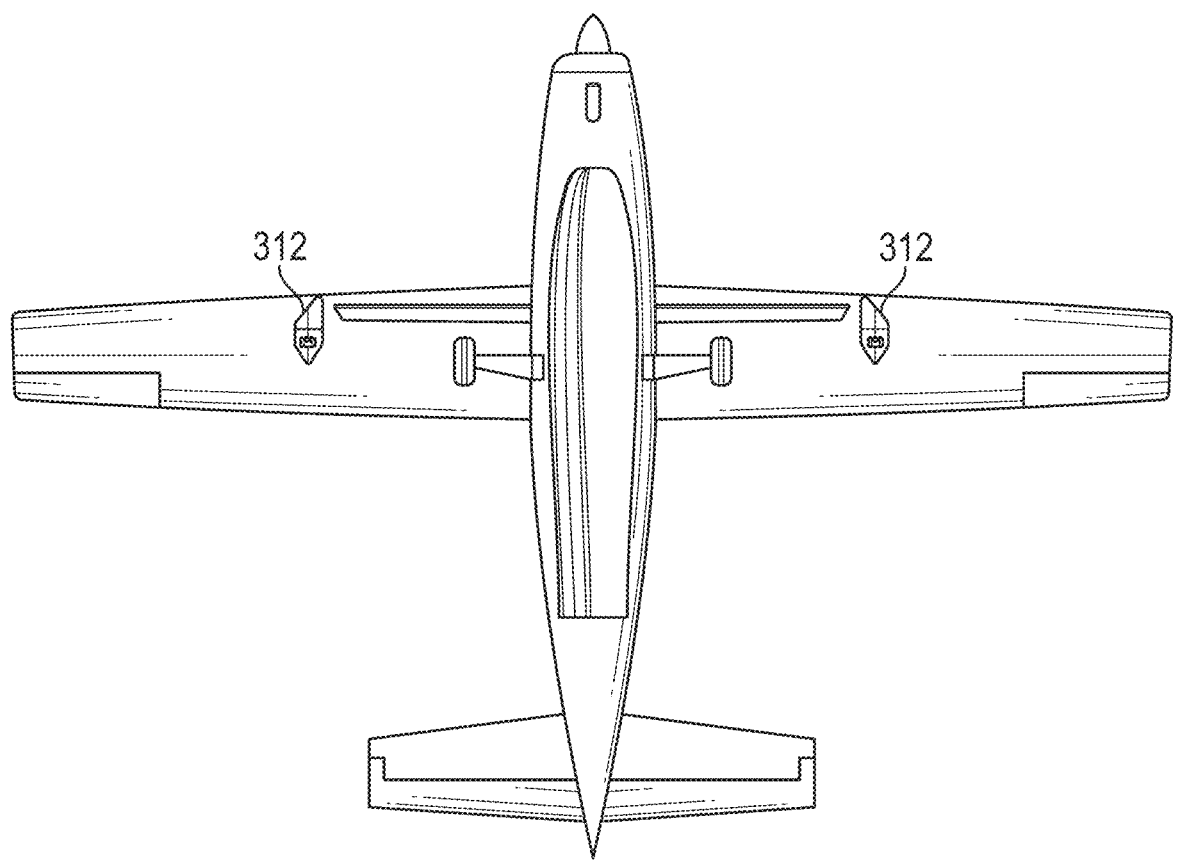
Figure 5:
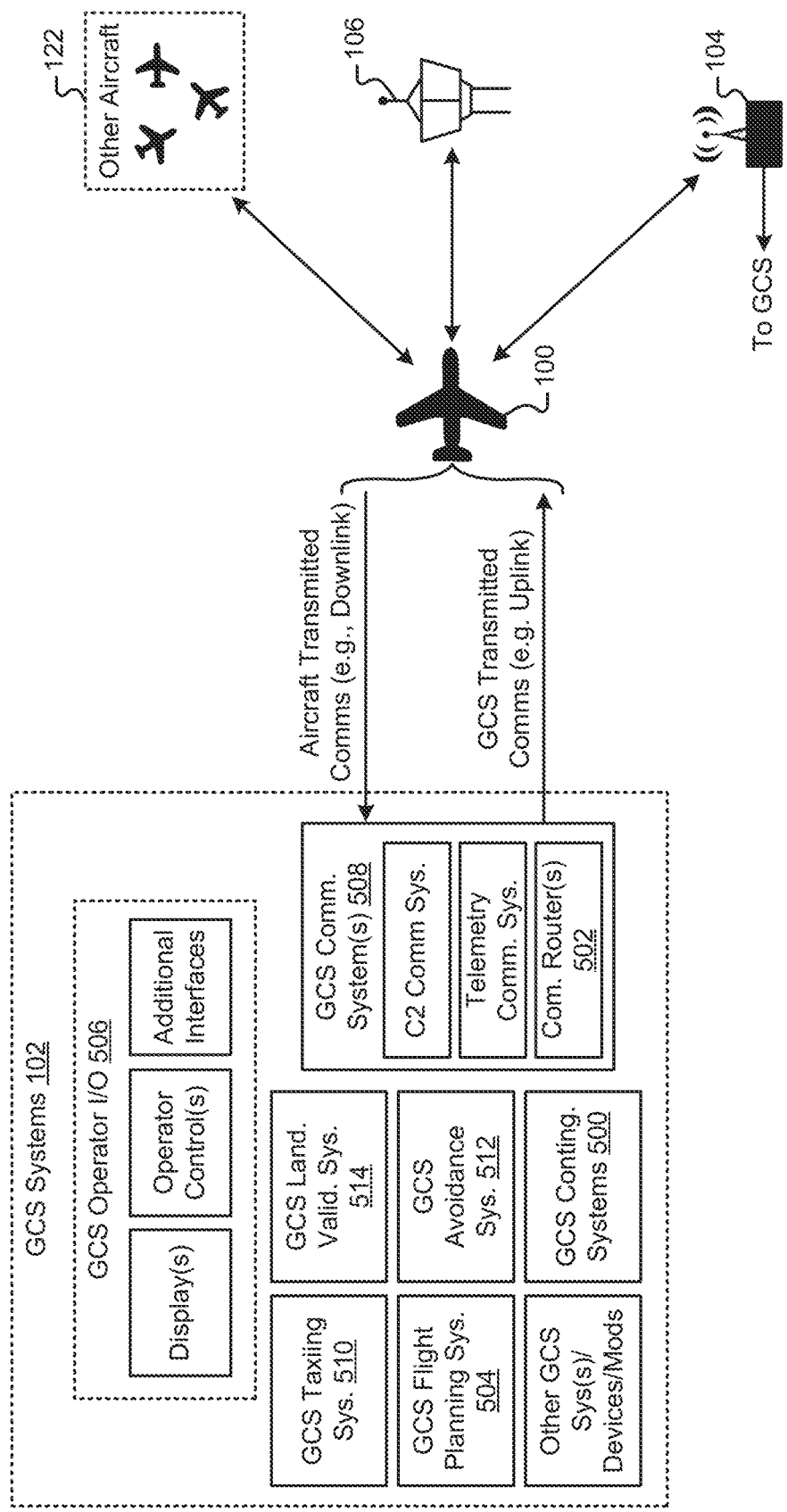
FIG. 5 illustrates an example GCS in communication with an aircraft.

FIGS. 3A-4C illustrate example sensors and mounting locations on the aircraft. FIGS. 3A-3C illustrate example sensors that may be included on an aircraft. FIGS. 4A-4C illustrate example sensors included on an aircraft. FIGS. 3A-3B illustrate different views of an example sensor assembly 300. The sensor assembly 300 of FIGS. 3A-3B includes a long range camera 302, a radar 304, 2 EO cameras 306-1, 306-2, and a LIDAR 308. The sensor assembly 300 includes an attachment device 310 (e.g., a mount/clamp) that is configured to attach to an aircraft. For example, the mount of FIGS. 3A-3B may attach to an aircraft wing strut (e.g., between the wing and fuselage). FIGS. 4A-4B illustrate an example aircraft that includes the sensor assembly of FIGS. 3A-3B attached to the wing strut.

FIG. 3C illustrates another example sensor assembly 312 that includes a radar 314, cameras 316, and LIDAR 318. The sensor assembly 312 is packaged in a sensor package that is configured to attach to an aircraft as an underwing mount. FIG. 4C is an example aircraft that includes the sensor assembly 312 of FIG. 3C mounted under both wings. The example aircraft platform illustrated in FIGS. 4A-4C is a Cessna Caravan 208B. The sensor assemblies 300, 312 (e.g., detect and avoid pods) may include sensors used to detect both airborne and ground-based objects that may pose a collision risk for the aircraft 100.

FIG. 5 illustrates an example GCS 102 in communication with an aircraft 100. The GCS 102 includes GCS communication systems 508 and GCS operator I/O 506. The GCS 102 may also include additional systems, such as a GCS taxiing system 510, GCS flight planning system 504, GCS avoidance system 512, GCS landing validation system 514, and GCS contingency systems 500. The GCS may also include other GCS systems, devices, and modules that provide additional functionality associated with the GCS 102 herein.

The GCS 102 may include one or more GCS communication systems 508 that may communicate with the aircraft 100, one or more base stations 104 during a mission (e.g., one or more at a time), one or more ATCs 106 during a mission (e.g., one or more at a time), and other parties. The GCS 102 may include similar communication systems as described with respect to the aircraft 100. For example, the GCS 102 may include line of sight communication systems, satellite communication systems, and cellular communication systems. The GCS 102 may also include VHF radio communication systems. The GCS 102 may communicate with the aircraft 100, base stations 104, and/or ATC 106 using one or more of the above communication systems.

The GCS communication systems 508 may also include land-based communication systems, such as WiFi communications, landline Internet communications, and landline phone communications. The GCS 102 may communicate with the base stations 104 and/or ATC 106 using the land-based communication systems. Additionally, any data sent/received to/from the aircraft 100 may use a landline connection (e.g., Internet connection) at the GCS 102. Accordingly, some communications sent/received between the aircraft 100 and the GCS 102 via the base stations 104 may be handled partially by land-based communication systems.

Example communications from the GCS 102 to the aircraft 100 are now described for a variety of scenarios. If the GCS 102 is near one or more airports, the GCS 102 may communicate with the ATC 106 (e.g., the local ATC) via VHF radio. If the GCS 102 is remotely located from one or more airports, the GCS 102 may relay VHF radio voice communications through the aircraft 100. In scenarios where the aircraft 100 is near the GCS 102, the GCS 102 may communicate with the aircraft 100 using a local line of sight radio. In scenarios where the aircraft 100 is in communication with a base station 104, the GCS 102 may send/receive data to/from the aircraft 100 via the base station 104. In scenarios where the aircraft 100 is in communication with a cellular network, the GCS 102 may send/receive data to/from the aircraft 100 via the cellular network. In scenarios where the aircraft 100 is remote from the GCS 102, base stations 104, and cellular communication, the GCS 102 and aircraft 100 may communicate via satellite communications. Note that any of the one or more types of communications may be established at the GCS 102 during taxiing/flight.

The GCS 102 includes operator I/O 506 that the operator may use to generate data (e.g., generate and modify taxi plans and flight plans), monitor the aircraft (e.g., view downlinked parameters and video feeds), command the aircraft (e.g., send data via the C2 link), receive communications (e.g., VHF voice communications), and/or perform other functions described herein. The operator I/O 506 may include operator controls, one or more displays, and additional interfaces. The operator I/O may include and/or interface with one or more computing devices included in the GCS 102, such as desktop/laptop computing devices, mobile computing devices (e.g., smartphones, tablets, etc.), and/or server computing devices.

The operator controls include devices used by the operator to interface with the GCS computing systems. Example controls may include input devices, such as keyboards, pointing devices (e.g., a mouse), dedicated input hardware (e.g., buttons/switches), and/or other input devices. In some implementations, the operator I/O 506 may include devices similar to those used in the aircraft, such as a flight yoke, power lever, manual buttons/switches, and other controls corresponding to manual aircraft controls.

The displays may include a variety of display technologies and form factors, including, but not limited to: 1) a display screen (i.e., monitor), such as a liquid-crystal display (LCD) or an organic light emitting diode (OLED) display, 2) a HUD, 3) a helmet mounted display, 4) a head mounted display, 5) augmented reality glasses/goggles, and/or 6) a standalone computing device (e.g., a tablet computing device). The displays may provide different types of functionality. In some implementations, a display may be referred to as a primary flight display (PFD). The PFD may display a variety of information including, but not limited to, an attitude indicator, an airspeed indicator, an altitude indicator, a vertical speed indicator, a heading, and navigational marker information. In some implementations, a display may be referred to as a multi-function display (MFD). An MFD may refer to an auxiliary display/interface that may display a variety of data, such as a navigation route, in conjunction with a primary flight display. The GCS/aircraft may include different types of displays that include GUIs that are rendered based on a variety of data sources (e.g., sensors, navigation systems, communication systems, operator input, etc.). In some implementations, an operator (e.g., pilot) may have different displays for C2 data and telemetry data. The different displays and GUIs described herein are only examples.

Additional interfaces may include audio interfaces (e.g., speakers, headphones, microphones, etc.), haptic feedback, and other I/O devices, such as readouts, gauges, and other additional interfaces, some of which may be specific to different systems (e.g., dedicated contingency interfaces).

A remote operator may monitor the aircraft 100 while taxiing and/or during flight. The remote operator may modify the taxi plan and/or flight plan using operator I/O 506. In some implementations, the flight plan and the taxi plan may be displayed to the remote operator on a display so that the remote operator may follow the flight plan and the taxi plan being executed in real time.

As described herein, the operator I/O 506 may provide a variety of interfaces for the operator to generate data, monitor data, and send commands associated with the functionality attributed to the GCS 102 herein. For example, the GCS may display GUIs that provide a variety of information, such as: 1) crew alerting messages, 2) system monitoring and link status GUIs, 3) a map GUI (e.g., moving map and flight planning GUI), and 4) attitude and heading information. Traffic alerting may also be provided through the GCS operator I/O. Crew alerting features may also be used to communicate faults or failures that may require the operator's attention. A crew alerting GUI may include colored indicators (or other graphical indicators). For example, green may represent a current status with no action needed, yellow/amber may indicate caution where the operator may need to act, and red may indicate a failure where the operator should take immediate action.

In some implementations, the GCS 102 may include a flight engineer that is separate from the operator. The flight engineer may operate at a flight engineering station in the GCS. A flight engineer may monitor aircraft operations (e.g., as additional monitoring resources), such as lower-level aircraft operations and other data sent via the telemetry link. In some implementations, data acquired by the flight engineering station may be used in further development/engineering of the aircraft 100, GCS 102, or other systems.

Figure 6A:
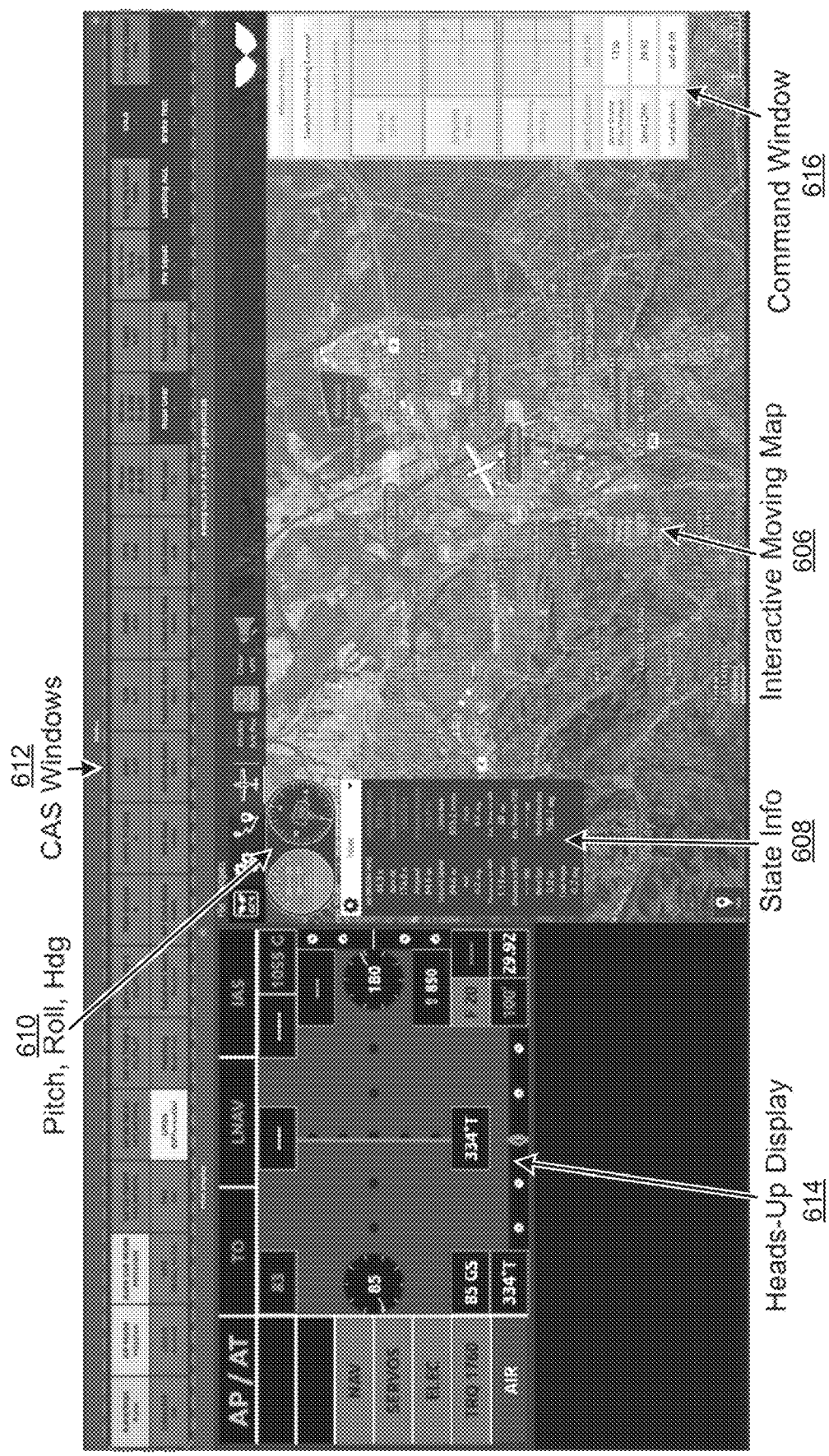
FIG. 6A is an example primary flight display that provides a variety of information to a human operator at the GCS.
Figure 6B:
FIG. 6B is an example avoidance graphical user interface (GUI) including a real-time video feed from cameras included on the aircraft.
Figure 6C:
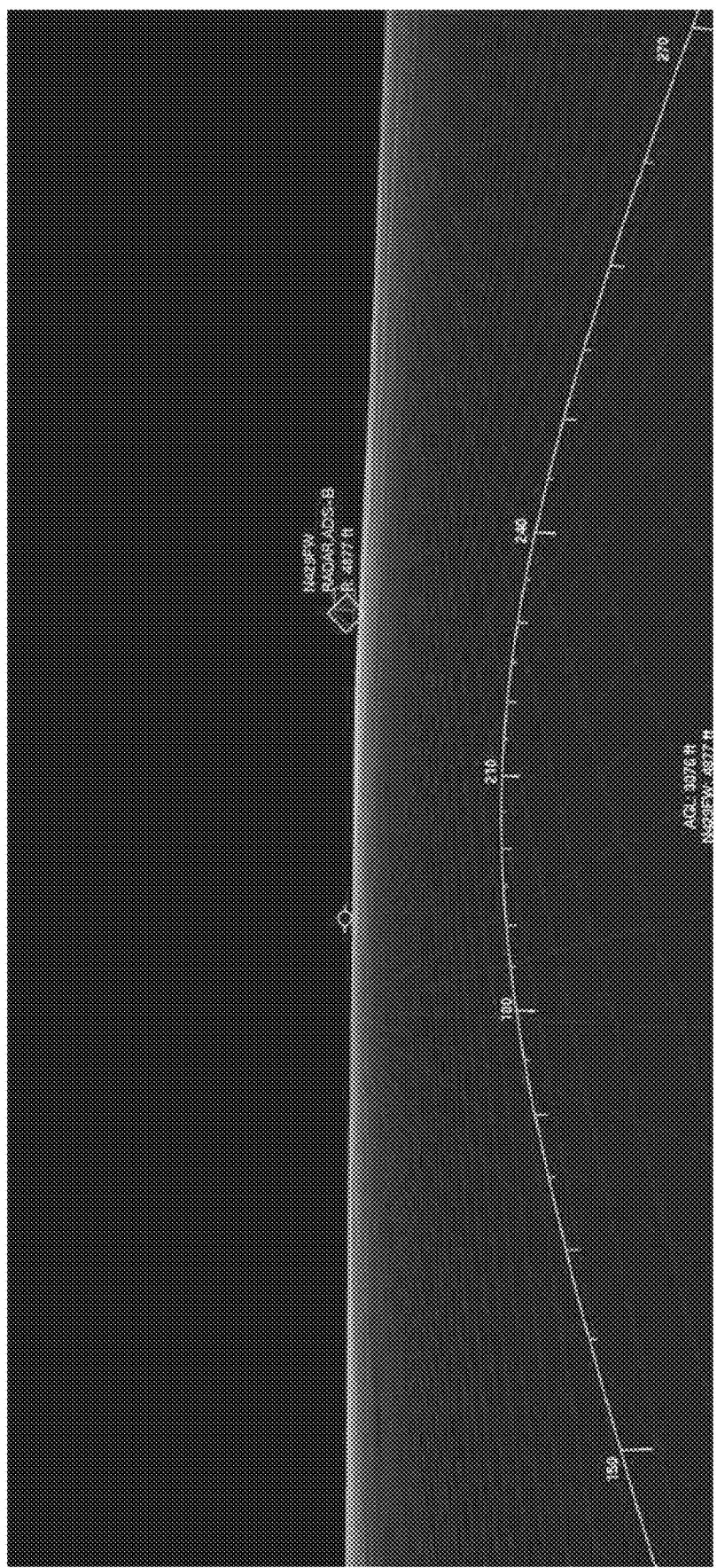
FIG. 6C is an example avoidance GUI that is graphically rendered.
Figure 6D:
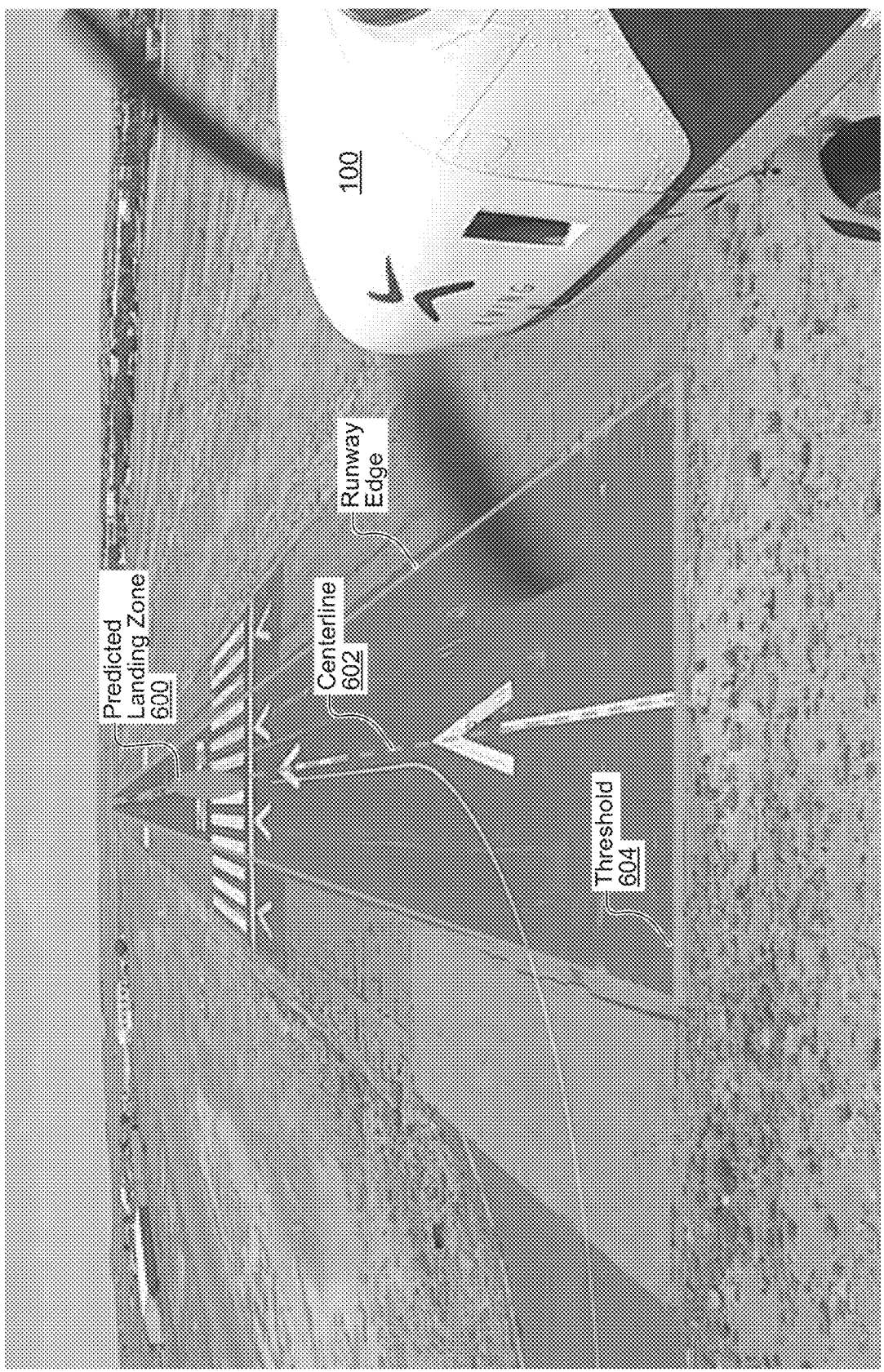
FIG. 6D illustrates an example landing validation GUI.

FIGS. 6A-6D illustrate example interfaces that may be provided by the operator I/O 506. FIG. 6A is an example primary flight display that provides a variety of information to the operator. Example information may include, but is not limited to, 1) an interactive moving map 606, 2) state information 608 (e.g., altitude, airspeed, etc.), 3) pitch/roll/heading indicators 610, 4) CAS windows 612, 5) a heads up display 614, and 6) a command window 616.

FIG. 6B is an example avoidance GUI. The GUI provides the remote operator with a view of what the avoidance system 220, 512 is monitoring (e.g., "seeing"). In FIG. 6B, the triangles may represent aircraft or other objects that the avoidance system 220, 512 has detected and identified as a potential threat to the aircraft 100. The avoidance system 220, 512 may track and display the objects. In some implementations, the avoidance GUI may include colored areas that indicate areas of danger or areas the aircraft can move into safely. For example, red/green areas may indicate danger/safety. The GUI of FIG. 6B is a real-time video feed from cameras included on the aircraft 100. FIG. 6C is another avoidance GUI that is graphically rendered (e.g., instead of video). FIG. 6C may represent an avoidance GUI rendered during flight. The avoidance GUI in FIG. 6C includes another aircraft detected via RADAR ADS-B. FIG. 6D illustrates an example landing validation GUI, as described herein.

FIGS. 7A-8C are flow diagrams that illustrate different operations that may be performed by different parties during the course of an unmanned aircraft mission. For example, the flow diagrams may include human responsibilities and/or technical operations prior to taxiing at the origin airport, during flight, and after taxiing at the destination airport. The parties described in the flow diagrams of FIGS. 7A-8C include a remote operator at the GCS 102, the GCS 102 (e.g., GCS computing systems), an aircraft 100 (e.g., UA 100), and origin/destination ground crew.

The actions associated with the remote operator in FIGS. 7A-8C may be performed using GCS computing systems/devices. For example, the remote operator may receive data (e.g., taxi/flight plans and ATC instructions/clearances), view data (e.g., taxi/flight plans, video feeds, other GUIs), modify data (e.g., taxi/flight plans), and provide other inputs (e.g., commands to other parties) using the GCS computing systems/devices described herein. In some cases, actions associated with the ground crew may be performed using ground crew devices (e.g., mobile computing devices). For example, the ground crew may view instructions and checklists on the ground crew devices. As another example, the ground crew may confirm on the ground crew devices (e.g., in GUIs) that the ground crew is performing a task and/or has completed a task. In some cases, ground crew devices may include computing devices on the aircraft and/or in the vicinity of the aircraft, such as a maintenance interface panel and/or another computing terminal.

The actions taken by the remote operator and the ground crew may be reflected in the user interfaces on the GCS computing systems and ground crew devices. For example, the remote operator and ground crew may view the progress of various actions taken by the other party. In a specific example, the remote operator may view indicators (e.g., GUI indicators) on the GCS computing systems indicating that the ground crew is towing out the aircraft. The remote operator and the ground crew may also receive data indicating when actions have been completed and/or new actions have been requested/commanded. For example, the GCS may receive indication that the ground crew has completed a ground crew preflight checklist.

The GCS and UA blocks in FIGS. 7A-8C may indicate operations that are automatically performed by the GCS 102 and/or the UA 100 (e.g., the GCS and/or UA computing systems). For example, the GCS 102 and/or UA 100 may run automatic checklists, generate plans, verify plans, and update plans. The GCS and UA blocks in FIGS. 7A-8C may also indicate that the GCS 102 or UA 100 has notified other parties of a current status or completed action. In one example, the GCS 102 and/or UA 100 may command a UA engine start. In this example, the UA 100 and/or GCS 102 may notify the remote operator and ground crew on their respective computing devices that the engine is being started and/or has been started.

The remote operator and ground crew may provide input into computing devices in order to indicate to the GCS 102 and/or UA 100 that specific actions are being performed and/or have been completed. The GCS 102 and/or UA 100 may respond to the indications. For example, the ground crew may interact with a ground crew computing device to indicate that the cargo is loaded and the aircraft doors are closed. In response to the receiving the indication, the GCS 102 and/or UA 100 may check whether the doors are secured. In some implementations, the ground crew may communicate with the aircraft through a wireless device (e.g., WiFi, BLUETOOTH, or other communication technology) and/or through a maintenance interface panel on the aircraft (e.g., at the side of the aircraft).

Figure 7A:
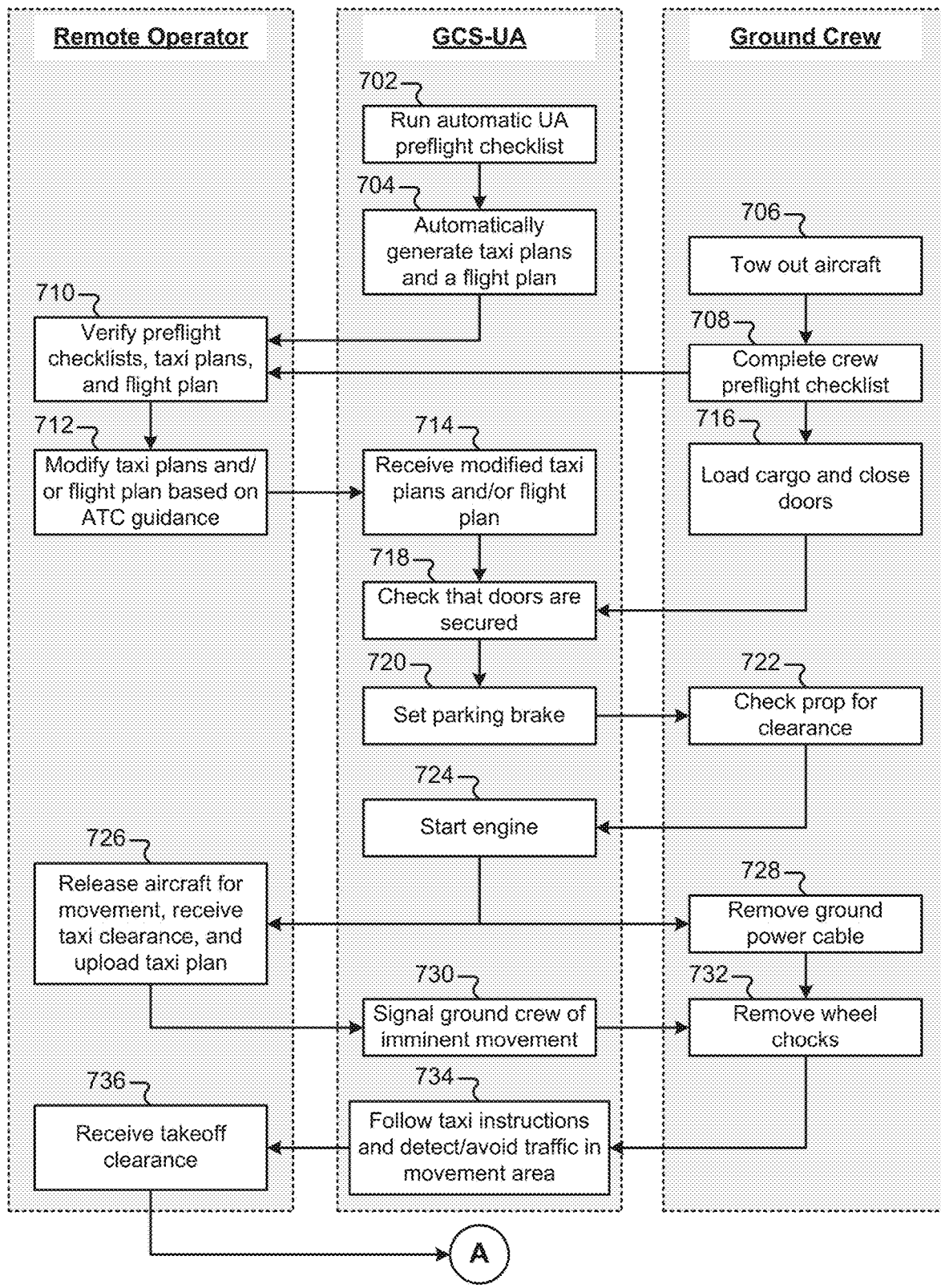
FIGS. 7A-8C are flow diagrams that illustrate different operations that may be performed by different parties during the course of an unmanned aircraft mission.
Figure 7B:
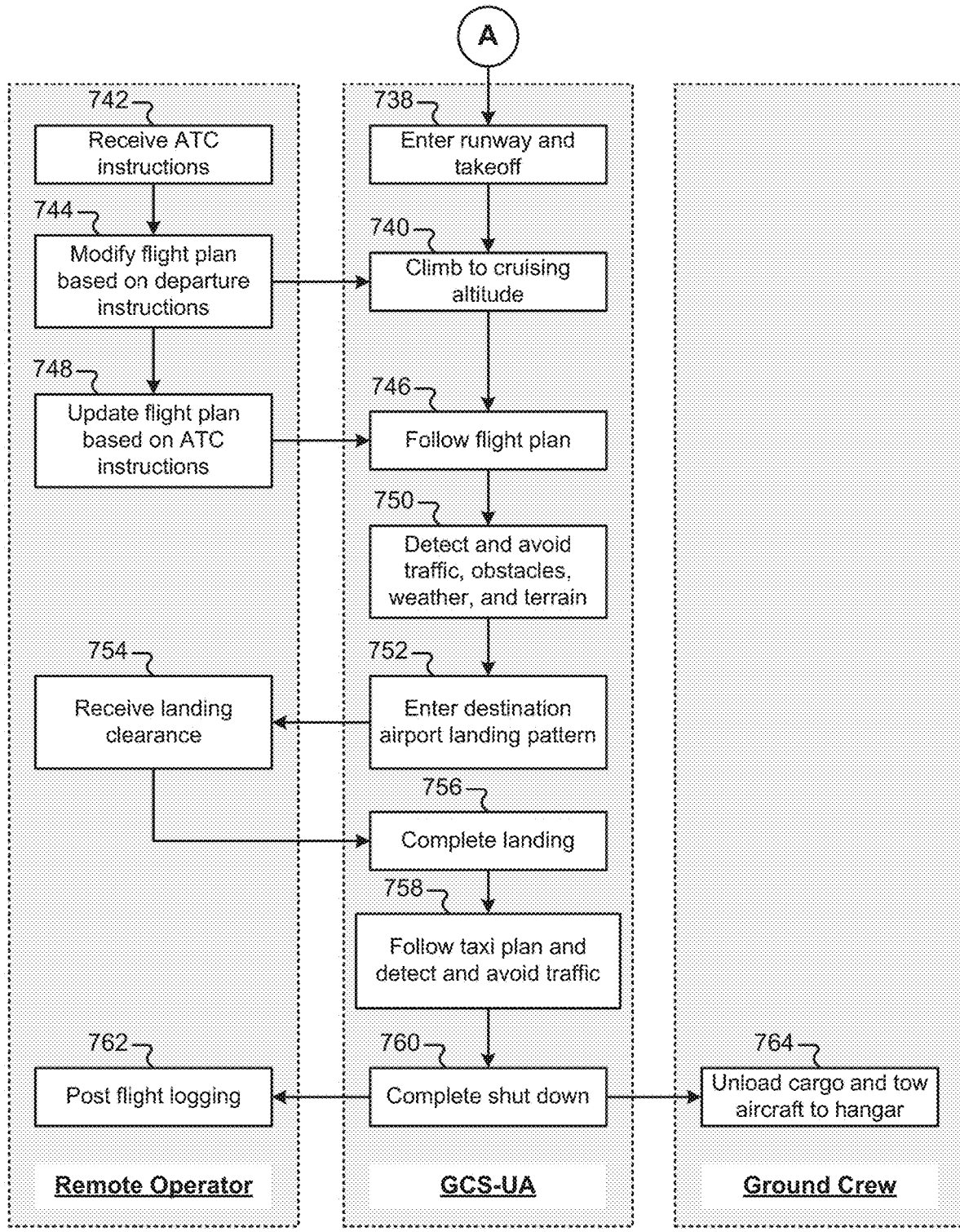

Referring to FIGS. 7A-7B, a central column for the GCS-UA may indicate operations that may be performed by the GCS 102 and/or UA 100. The GCS 102 and UA 100 may perform the operations and report the progress/completion of the operations back to one another. For example, the GCS 102 may generate a flight plan and provide the flight plan to the UA 100. As another example, the UA 100 may generate a flight plan and report the flight plan to the GCS 102. As such, the operations performed in the GCS-UA column may be performed by a either party (e.g., GCS 102 or UA 100).

Note that the blocks of FIGS. 7A-8C generally indicate the order of operations for different parties. For example, blocks that receive arrows from earlier blocks may indicate actions that are performed later than actions in the earlier blocks. In some cases, later actions may be triggered in response to the completion of earlier actions. Note that some actions in FIGS. 7A-8C may be performed at the same time. For example, the crew may load cargo while the GCS 102 and/or UA 100 are generating flight plans.

In block 702, the GCS-UA 102, 100 may run an automatic UA preflight checklist. Example UA preflight checklist data may include, but is not limited to, health and status of aircraft electrical components, current configuration of the UA fuel and electrical system, tests to ensure the functionality of primary and secondary flight controls, tests to ensure wireless data connections are established, and tests on the propulsion system to ensure it is functioning correctly. In block 704, the GCS-UA 102, 100 may automatically generate taxi plans and a flight plan.

In blocks 706-708, the ground crew may tow out the UA 100 and complete a crew preflight checklist (e.g., in a ground crew computing device 110 or via voice radio). In some implementations, the ground crew may perform other tasks, such as fueling the aircraft. An example crew preflight checklist may include, but is not limited to, weighing each package and loading cargo in the correct location, visual checks of the exterior of the UA 100 for damage, and checks for the fuel type and moisture content.

In block 710, the remote operator may view and verify the UA preflight checklist and crew preflight checklist in a preflight checklist GUI. The remote operator may provide a verification input to verify the checklists to the GCS 102 and UA 100. For example, if the checklists are complete, the remote operator may select a checklist GUI element (e.g., a "Complete" GUI button) indicating that the checklists are complete and verified.

In block 710, the remote operator may also view the taxi plans and flight plan in a taxi plan GUI and a flight plan GUI. In some implementations, the remote operator may provide a verification input to verify the taxi plans and the flight plan. For example, if the taxi plans are complete, the remote operator may select a taxi plan GUI element (e.g., a "Complete" GUI button) to indicate that the taxi plans are complete and verified. As another example, if the flight plan is complete, the remote operator may select a flight plan GUI element to indicate that the flight plan is complete and verified.

In block 712, the remote operator may modify the taxi plans and/or the flight plan in the taxi plan GUI and flight plan GUI. For example, the remote operator may modify the taxi plans and/or flight plan according to ATC instructions. In block 714, the UA 100 may receive the modified taxi plans and/or modified flight plans.

In block 716, the ground crew may load cargo onto the UA 100 and close the UA doors. In some implementations, the ground crew may indicate that cargo is loaded and/or the doors are closed in the ground crew computing devices 110. In block 718, the GCS-UA 102, 100 may check that doors are secured (e.g., as indicated by the UA 100). In block 720, the UA 100 may set the parking brake. For example, the UA 100 may set the parking brake automatically. As another example, the GCS 102 may command the UA 100 to set the parking brake automatically and/or in response to an input from the remote operator. In block 722, the ground crew may check the propeller for clearance.

In block 724, the UA 100 may start the engine. For example, the UA 100 may automatically start the engine. As another example, the GCS 102 may command the UA 100 to start the engine automatically and/or in response to input (e.g., a start engine instruction) from the remote operator. In some implementations, the UA sensors may scan the area for clearance from people, animals, vehicles, or objects prior to start. In block 726, the remote operator may instruct that the UA 100 be released for movement. For example, the remote operator may provide an input instructing the UA 100 to be released for movement and/or provide a verbal instruction. In block 726, the remote operator may also receive taxi clearance and upload a taxi plan (e.g., a recently modified taxi plan).

In block 728, the ground crew may remove the ground power cable for the UA 100. In some implementations, the ground crew may indicate the cable removal in the ground crew computing devices 110. In other implementations, the UA 100 may detect the removal of the ground power cable.

In block 730, the GCS-UA 102, 100 may signal ground crew of imminent movement. For example, the GCS-UA may sound an alarm and/or flash lights (e.g., anticollision lights) on the UA 100 or near the UA 100 to indicate imminent movement of the UA 100. In some implementations, the UA 100 may include lights and/or speakers (or other sound devices) that indicate imminent movement. In some implementations, the GCS-UA may notify the ground crew of imminent movement in the ground crew computing device interface. In response to imminent movement, the ground crew may remove the wheel chocks in block 732. In some cases, the ground crew may indicate that the wheel chocks are removed in the ground crew computing devices 110 and/or via radio.

In block 734, the UA 100 follows the taxi plan and performs detect and avoid maneuvers in the airport movement area. In block 734, the UA 100 may wait to receive takeoff clearance. In block 736, the remote operator receives takeoff clearance (e.g., from ATC 106-1).

In blocks 738-740, the UA 100 enters the runway, takes off, and climbs to cruising altitude. In blocks 742-744, the remote operator may receive ATC instructions and modify the departure instructions (e.g., departure portion of the flight plan) based on the received ATC instructions. If the remote operator modifies the departure portion of the flight plan, the remote operator may provide the modifications to the UA 100 (e.g., while climbing to cruising altitude in block 740).

In block 746, the UA 100 follows the flight plan. In block 748, the remote operator may receive ATC instructions and modify the flight plan being followed by the UA 100. In block 750, the UA 100 may perform detect and avoid operations while following the flight plan. For example, the UA 100 may detect and avoid traffic, obstacles, weather, and/or terrain.

In block 752, the UA 100 enters the destination airport landing pattern. In block 754, the UA 100 and/or GCS 102 may receive landing clearance from ATC 106-2. In block 756, the UA 100 completes landing automatically. In some implementations, the UA 100 may require GCS clearance before landing. In block 758, the UA 100 follows the taxi plan and detects/avoids traffic while following the taxi plan. In block 760, the UA 100 completes shut down. In block 762, the remote operator performs post flight logging (e.g., logs Hobbs time). In block 764, the destination ground crew unloads the cargo and tows the UA 100 to the hangar.

Figure 8A:
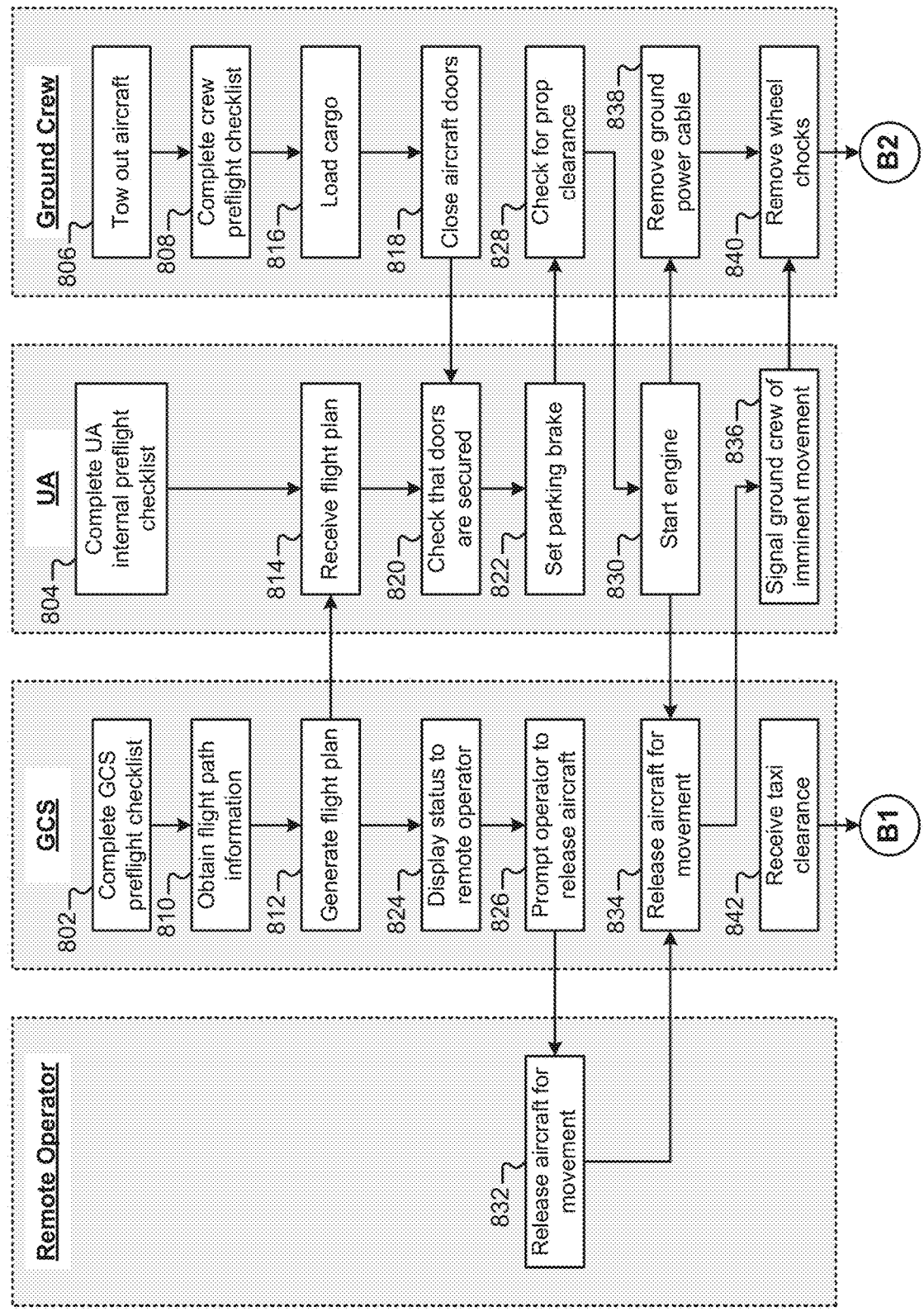
Figure 8B:
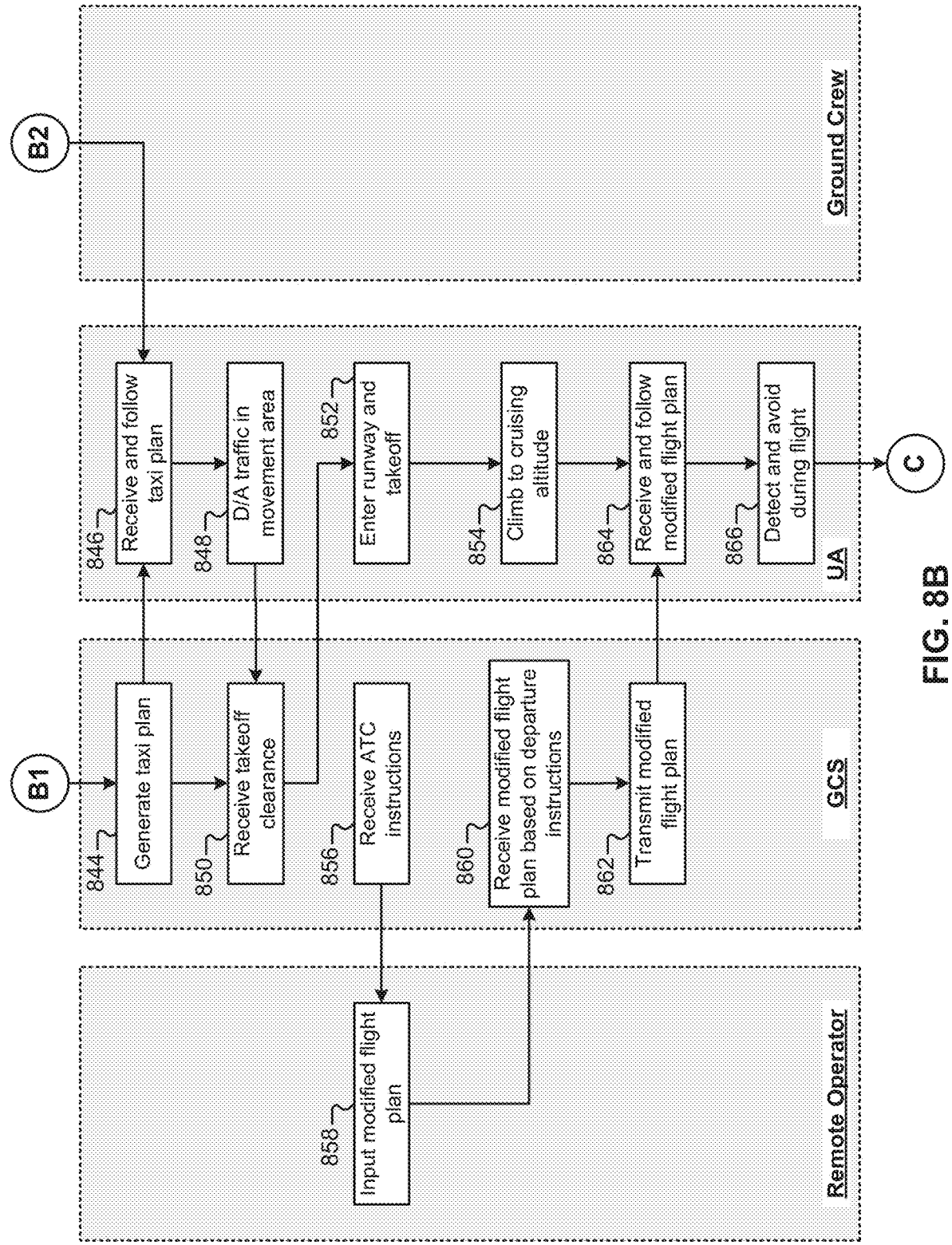
Figure 8C:
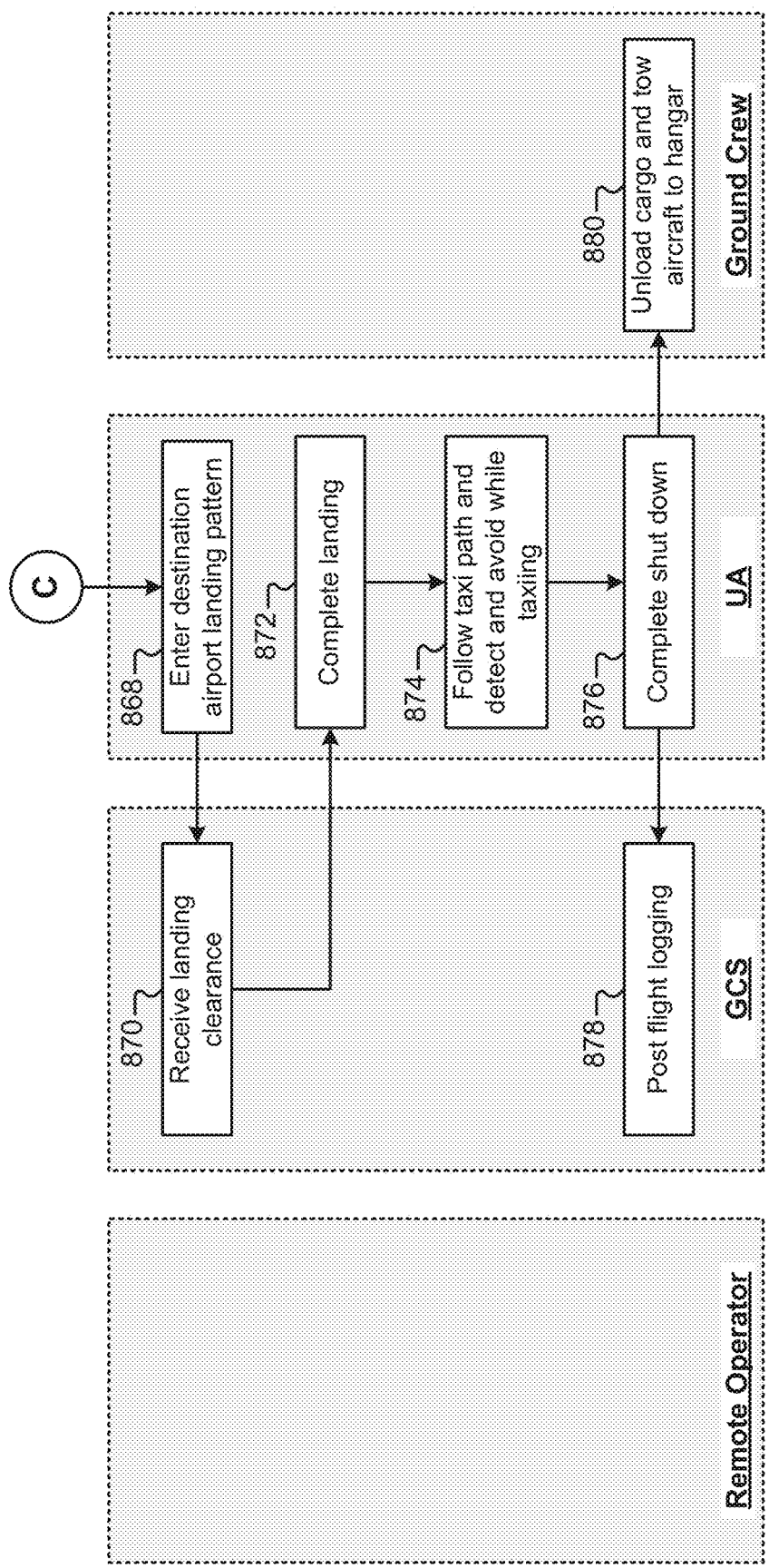

FIGS. 8A-8C are flow diagrams illustrating another example implementation of the UA 100 and GCS 102. In block 802, the GCS 102 completes a GCS preflight checklist. In block 804, the UA 100 completes a UA internal preflight checklist. In blocks 806-808, the ground crew tows out the UA 100 and completes the crew preflight checklist.

In blocks 810-812, the GCS 102 obtains flight path information and generates a flight plan. In block 814, the UA 100 receives the flight plan from the GCS 102. In blocks 816-818, the ground crew loads the cargo and closes the aircraft doors. In block 820, the UA 100 checks that the doors are secure. In block 822, the UA 100 sets the parking brake.

In blocks 824-826, the GCS 102 displays status to the remote operator and prompts the operator to release the UA 100 for movement. In block 828, the ground crew checks for propeller clearance. In block 828, the ground crew may indicate to the UA 100 that propeller clearance is checked. In block 830, the UA 100 starts the engine.

In block 832, the remote operator inputs commands to release the UA 100 for movement. In block 834, the GCS 102 releases the aircraft for movement. In response to the release for movement, the UA 100 signals the ground crew of imminent movement in block 836. In block 838, the crew may remove the ground power cable from the UA 100. In block 840, the ground crew may remove the wheel chocks (e.g., in response to the UA signal).

In block 842, the GCS 102 receives taxi clearance from ATC 106-1. In block 844, the GCS 102 generates a taxi plan and sends the taxi plan to the UA 100. In blocks 846-848, the UA 100 receives the taxi plan and follows the taxi plan while performing detect and avoid in the movement area. In block 850, the GCS 102 receives takeoff clearance from the ATC 106-1. In blocks 852-854, the UA 100 enters the runway, takes off, and climbs to cruising altitude.

In block 856, the GCS 102 receives additional ATC instructions. In block 858, the remote operator modifies the flight plan according to ATC instructions received in block 856. In blocks 860-862, the GCS 102 receives the modified flight plan and transmits the modified flight plan to the UA 100. In blocks 864-866, the UA 100 receives and follows the modified flight plan while performing detect and avoid during flight.

In block 868, the UA 100 enters the destination airport landing pattern and requests landing clearance from the GCS 102 (e.g., clearances from ATC 106-2). In block 870, GCS 102 receives landing clearance and instructs the UA to land. In blocks 872-874, the UA 100 completes the landing and follows the taxi path while performing detect and avoid operations. In block 876, the UA 100 shuts down. In block 878, the GCS 102 may perform automatic post flight logging. In block 880, the destination ground crew unloads the cargo and tows the UA 100 to the hangar.

The aircraft 100 and GCS 102 may include contingency systems 200, 500 that implement contingency detection operations and contingency management operations (e.g., contingency path planning operations) in response to contingency scenarios described hereinafter. Example contingency scenarios may include lost communication scenarios, component/system failures, and fly away scenarios. One or more of the scenarios may occur during a flight. FIGS. 9-14 illustrate example methods for managing various contingency scenarios. For example, the methods of FIGS. 9-14 may describe contingency management operations that may be implemented by the aircraft 100, GCS 102, and/or other parties in response to a contingency scenario.

During normal scenarios without lost communications, the aircraft 100 may have one or more of the communication links available at any time. In a lost communication scenario, one or more communication links between the GCS 102 and aircraft 100 may be degraded and/or lost. For example, in a lost communication scenario, communications between the aircraft 100 and the GCS 102 may be degraded to such an extent that communications between the aircraft 100 and GCS 102 are no longer reliable. In a specific example, a lost communication scenario may refer to a scenario in which communications have degraded to a sufficiently unreliable level or communications have been completely lost between the aircraft and the GCS. In some cases, a lost communication scenario may occur when data is not being received at a proper time. Additionally, or alternatively, a lost communication scenario may occur when communications received at the aircraft and/or GCS include incorrect data (e.g., corrupted data) due to a degraded communication link. With specific reference to the C2 link, a lost communication scenario may occur when the C2 link is degraded to a point where commands sent from the GCS and the status received at the GCS are insufficient for controlling the aircraft effectively.

As described herein, the aircraft 100 and the GCS 102 may be in communication with one another via one or more communication links. Additionally, the aircraft 100 and GCS 102 may include link monitoring hardware/software (e.g., an aircraft communication router and/or GCS communication router 502) that indicates the strength of the links. The communication routers may monitor each of the links and select links for communication between the aircraft and GCS. For example, the communication routers may pick the strongest links to use for communication. In some implementations, different communication links may provide different functions (e.g., C2 and telemetry functions). In some implementations, different communication links may provide redundant communications.

The aircraft 100 and GCS 102 may determine that a lost communication scenario has occurred in response to detection of lost communication conditions. Lost communication conditions may specify levels of degradation/loss for one or more communication links that should be present to qualify as a lost communication scenario. Put another way, the satisfaction of one or more lost communication conditions may indicate that the aircraft 100 and GCS 102 are operating in a lost communication scenario in which lost communication management operations should be implemented. The lost communication conditions may include a complete loss of one or more communication links (e.g., all C2 links). The lost communication conditions may also indicate a level of degradation in one or more communication links (e.g., a threshold level of degradation). The levels of degradation may be specified by one or more parameters, such as signal quality, signal strength, data rate, error rate, or other parameters. For example, the lost communication conditions may define threshold levels at which the communication link is considered lost. Example conditions that may trigger a lost communication scenario may include, but are not limited to, less than a threshold level of signal quality/strength, less than a threshold data rate, and/or greater than a threshold error rate. Lost communication conditions and lost communication management operations may vary based on a variety of considerations, such as a stage of flight (e.g., takeoff, en route, landing), location within the stage of flight (e.g., distances from airports), aircraft altitude (e.g., during landing), and other considerations.

In some implementations, the aircraft 100 and GCS 102 may implement a handshake protocol that may be used to determine whether a lost communication scenario is occurring. The handshake protocol may include the exchange of handshake data between the aircraft 100 and the GCS 102. In some implementations, the handshake data may be included along with other transmitted data, such as uplink commands or downlink data. In some implementations, the handshake data may be transferred as separate data. The aircraft and/or GCS may detect a lost communication scenario in the event that handshake data is not received in a timely manner, is not received at all, and/or is received in a corrupted format.

The handshake protocol may include the transfer of status data between the GCS 102 and aircraft 100. An example handshake protocol may include the GCS 102 sending a communication to the aircraft 100 indicating the GCS identity and the aircraft identity. In response to receiving the handshake data at the aircraft 100, the aircraft 100 may send a response indicating the aircraft identity and the GCS identity. A handshake protocol may be initiated by the aircraft 100 and/or the GCS 102. If the communication link sending the handshake data degrades or is lost, the handshake data may be received at a slower rate, include corrupt data, and/or be completely absent. Both the aircraft 100 and GCS 102 may keep track of the communication link status using the handshake protocol.

In some implementations, there may be a period of expected loss of communications. This may occur in any phase of flight. In one example, there may be an expected en route communication handoff that may result in an expected loss in one or more communication links. In other implementations, there may be an expected loss of communications when line of sight is lost. In scenarios where lost communications are expected, the GCS 102 and aircraft 100 may not implement lost communication management operations during the window (e.g., time/location window) of expected degradation/loss.

Lost communication conditions may be defined for different portions of the flight. For example, different lost communication conditions may be defined for takeoff, en route, and landing phases of flight. The different conditions may be based on the phase of flight, altitude of the aircraft, distance of the aircraft from the origin/destination airport, and/or other conditions. Specific lost communication scenarios and management operations are described herein in with respect to FIGS. 10-12.

The specific lost communication scenarios described herein are divided up into three separate lost communication phases, each of which may include one or more different typical phases of flight (e.g., takeoff, climb, en route, approach, descent, landing). Example scenarios described herein may include a first lost communication phase (i.e., initial phase) referred to as a "departure lost communication phase" (e.g., see FIG. 10). A second lost communication phase (i.e., middle phase) may be referred to as an "en route lost communication phase" (e.g., see FIG. 11). A third lost communication phase (i.e., final phase) may be referred to as a "landing lost communication phase" (e.g., see FIG. 12).

The contingency system(s) 200, 500 of the present disclosure may detect lost communication scenarios and perform contingency management operations in response to detecting the lost communication scenarios. The contingency management operations may vary based on a variety of parameters, such as a phase of flight, altitude, distance of the aircraft from the origin/destination airports, and/or other conditions. Example contingency management operations described herein may include, but are not limited to, 1) attempting to re-establish one or more degraded/lost communication links, 2) entering a loitering pattern (e.g., at the origin/destination airport or en route), 3) backtracking to re-establish a communication link, and/or 4) attempting to send out lost communication notices to GCS/ATC on other links (e.g., via one or more squawk codes and/or VHF radio communication).

Figure 9:
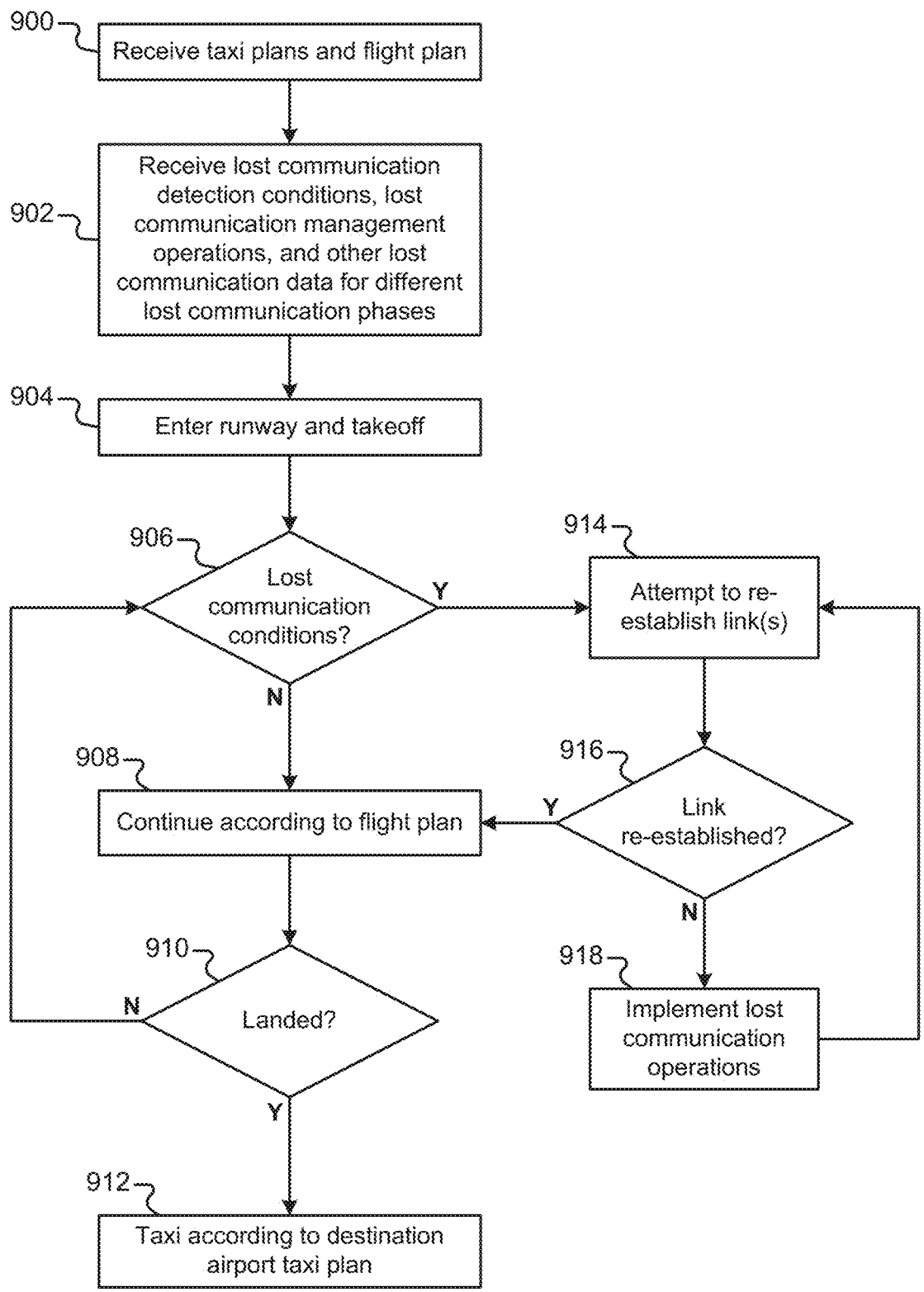
FIGS. 9-12 illustrate example lost communication scenarios and management operations.
Figure 10:
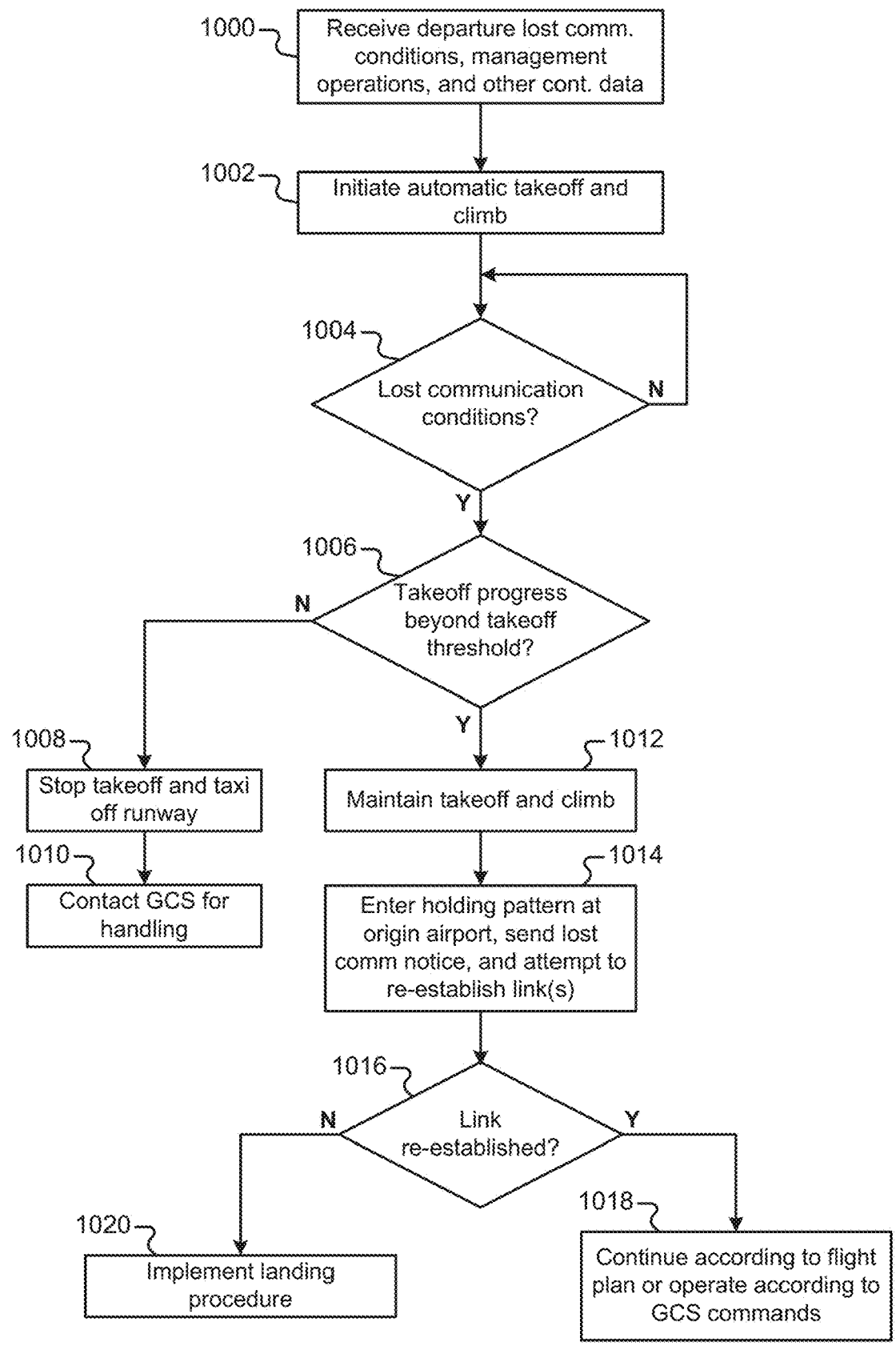
Figure 11:
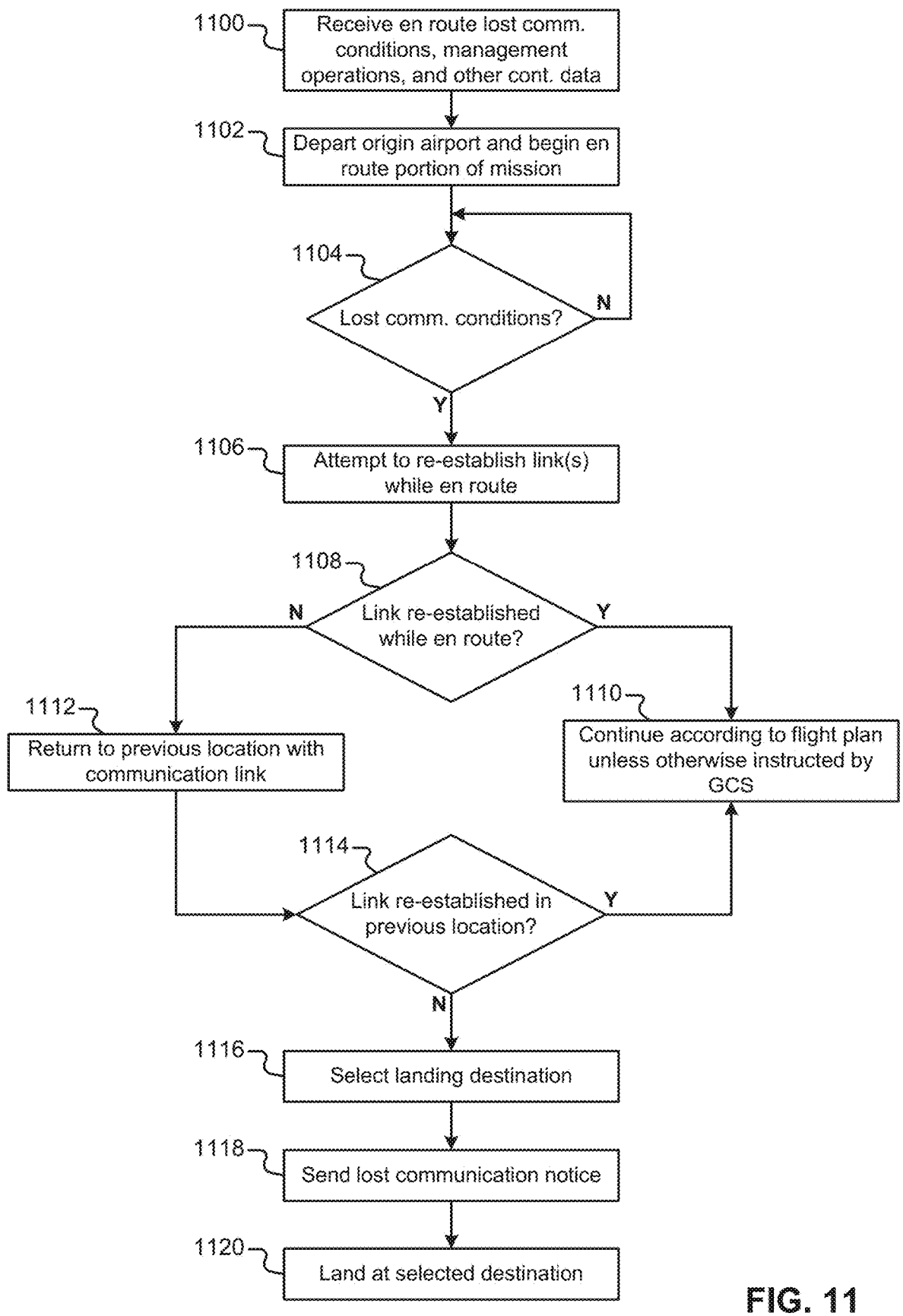
Figure 12:
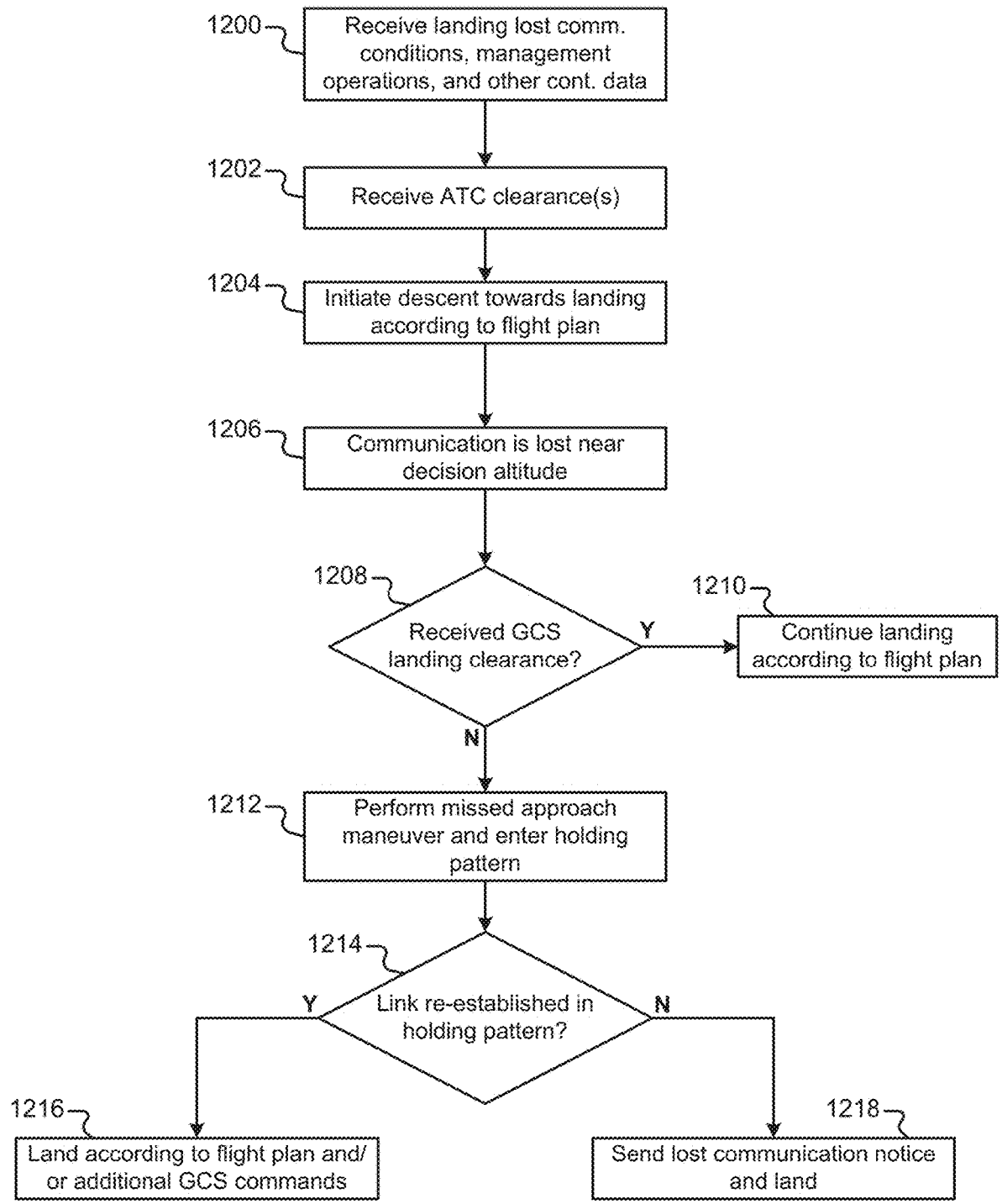

FIGS. 9-12 illustrate example lost communication scenarios and management operations. FIG. 9 illustrates a general lost communication scenario and lost communication management operations. FIGS. 10-12 illustrate example methods that describe lost communication detection and management that may occur during different phases of flight between takeoff at the origin airport and landing at the destination airport. For example, FIGS. 10-12 describe lost communication detection and management in a departure phase, en route phase, and final phase (e.g., a landing phase).

In some implementations, the GCS 102 and aircraft 100 may implement lost communication operations during taxiing. For example, in the case of a lost communication scenario during taxiing, the aircraft 100 may be configured to stop and attempt to re-establish one or more lost communication links. In the case the communication link is re-established, the aircraft 100 may continue according to the flight plan. In the case the communication link is not re-established, the aircraft 100 may be configured to taxi to a pre-determined location and/or wait to be towed by the ground crew.

FIG. 9 is a flow diagram that illustrates example lost communication operations for the aircraft 100 during flight. In block 900, the aircraft 100 receives taxi plans and a flight plan from the GCS 102. In block 902, the aircraft 100 receives contingency data including lost communication detection conditions and lost communication management operations for different lost communication phases, such as different phases of flight, different altitudes, different distances from the origin/destination airports, or other parameters. The aircraft 100 may identify a lost communication scenario based on the lost communication conditions loaded onto the aircraft 100 preflight. The aircraft 100 may also implement the lost communication management operations that were loaded onto the aircraft 100 preflight. Although the lost communication conditions and management operations are loaded onto the aircraft preflight, in some implementations, the conditions and operations may be sent to the aircraft and/or updated during flight.

In block 902, the aircraft 100 may also receive additional lost communication data from the GCS 102 preflight. Example additional lost communication data may include, but is not limited to, contingency landing sites (e.g., other potential airports or potential landing sites along the route), lost communication notices (e.g., one or more squawk codes, recorded audio for VHF transmission), and other data described herein.

In block 904, the aircraft 100 enters the runway and takes off. In block 906, during flight, the aircraft 100 determines whether lost communication conditions are satisfied. If lost communication conditions are not satisfied in block 906, the aircraft 100 may continue according to the flight plan in block 908 until landing. If the aircraft 100 lands in block

910, the aircraft 100 may taxi at the destination airport according to the taxi plan in block 912.

If the aircraft 100 determines that lost communication conditions are satisfied in block 906, the aircraft 100 may attempt to re-establish one or more degraded/lost communication links in block 914. For example, the aircraft 100 may restart one or more communication systems, switch between different communication systems, and/or loiter around a last known location in which the communication link was not degraded. If the communication link is re-established in a short period of time, the aircraft 100 may continue according to the flight plan in block 908.

If the communication links are not re-established in block 916, the aircraft 100 may implement lost communication operations according to the scenario in block 918. For example, the aircraft 100 may implement lost communication operations corresponding to the phase of flight, aircraft altitude, distances from the origin/destination airports, or other parameters. With respect to altitude, in some implementations, the aircraft may continue to climb if communications are lost moving down the runway and/or immediately after takeoff. If the aircraft is too low during approach and landing (e.g., under a threshold altitude), the aircraft may continue landing. With respect to location relative to an airport, in some implementations, the aircraft may return to the origin airport (e.g., if closer to the origin airport). If the aircraft is closer to the destination airport, the aircraft may continue to the destination airport. In some implementations, the aircraft may enter a holding pattern prior to implementing additional flight maneuvers. In some implementations, the aircraft may transmit a lost communication notice. In some implementations, the aircraft may execute a landing at a contingency landing site. In some implementations, contingency landing sites may include off-field landing sites. In these scenarios, the aircraft may include contingency landing operations for the off-field landing sites (e.g., off field specific landing operations).

FIG. 10 illustrates an example method for managing a lost communication scenario during a departure phase. The departure phase may begin after taxiing when the aircraft starts moving down the runway for takeoff. While moving down the runway for takeoff, there may be a defined point (e.g., location) in the runway and/or velocity of the aircraft at which the aircraft continues to takeoff regardless of whether there is a lost communication scenario. The departure phase may end after the aircraft has reached a specified threshold distance from the airport.

In block 1000, the aircraft 100 may receive contingency data including departure lost communication conditions, departure management operations, and other contingency data. In block 1002, the aircraft 100 initiates an automatic takeoff and climb according to the flight plan. In block 1004, the aircraft 100 monitors for lost communication conditions while moving down the runway. If lost communication conditions occur in block 1004, and the takeoff progress has not progressed beyond a takeoff threshold in block 1006 (e.g., a threshold location on the runway and/or velocity of the aircraft), the aircraft 100 may slow to a stop and taxi off the runway in block 1008. In some implementations, the aircraft 100 may attempt to contact GCS 102 for handling in block 1010.

If lost communication conditions occur in block 1004, and the takeoff progress has progressed beyond a takeoff threshold in block 1006, the aircraft 100 may takeoff and climb according to the flight plan (e.g., a contingency flight plan) in block 1012. In block 1014, the aircraft 100 may enter a holding pattern at the origin airport, send one or more lost communication notices, and attempt to re-establish communication links. Example lost communication notices may include one or more squawk codes (e.g., code 7400, 7600, 7700, and/or other codes) and/or one or more stored VHF radio transmissions indicating that communications have been lost and the aircraft is entering a holding pattern. For example, a VHF voice radio transmission may indicate "communication lost," "entering holding pattern," and/or "preparing to land." The GCS 102 and/or ATC 106-1 may be notified of the lost communication notice.

If communication is re-established in block 1016, the aircraft 100 may continue according to the flight plan or operate according to GCS commands in block 1018. If communication is not re-established in block 1016, in block 1020, the aircraft 100 may implement a landing procedure (e.g., a contingency landing procedure) that was defined prior to takeoff (e.g., in contingency data). Example landing procedures may include, but are not limited to, waiting for a predefined period of time at the loitering/holding pattern, sending one or more lost communication notices, and subsequently landing. Waiting for the period of time in the loitering/holding pattern may provide ATC 106-1 time to vacate the airspace and allow the aircraft 100 to land back at the airport 108-1. The loitering/holding pattern, waiting time, and/or other landing procedures may be predefined for one or more airports. The waiting time may also provide GCS 102 with additional time to resolve the lost communication issue.

FIG. 11 illustrates an example method for managing a lost communication scenario during an en route phase. The en route phase may begin after the aircraft 100 has climbed to a threshold altitude and/or moved a threshold distance from the origin airport 108-1 (e.g., outside of the airport's airspace). The en route phase may continue until the aircraft 100 has approached the destination airport 108-2 within a threshold distance (e.g., until reaching the destination airport airspace or a closer distance).

In block 1100, the aircraft 100 may receive contingency data including en route lost communication conditions, en route management operations, and other contingency data. In block 1102, the aircraft 100 departs from the origin airport 108-1 and begins an en route portion of the mission. In block 1104, the aircraft 100 monitors for lost communication conditions while en route to the destination airport 108-2. If lost communication conditions occur in block 1104, the aircraft 100 may attempt to re-establish one or more communication links in block 1106. The aircraft 100 may continue on the route for a predetermined distance and/or time while attempting to re-establish communications. If one or more communication links are re-established in block 1108, the aircraft 100 may continue according to the flight plan unless otherwise instructed by the GCS 102 in block 1110.

If one or more communication links are not re-established while en route, in block 1112, the aircraft 100 may return to a previous location in which the aircraft 100 had an established communication link. For example, the aircraft 100 may backtrack to a previous location (e.g., a last known location) in the current flight during which one or more communication links were established. If one or more communication links are re-established in the previous location in block 1114, the aircraft 100 may continue according to the flight plan unless otherwise instructed by the GCS 102 in block 1110.

Note that the aircraft 100 may interface with one or more base stations 104 during the route. In these cases, the aircraft 100 may lose line of sight communications with the base stations 104. In some implementations, the aircraft may be configured to expect a short loss in communications between base stations. In some implementations, the aircraft may be configured to route back to a previous base station to regain communication and/or re-route to a different base station than was on the original flight plan.

If one or more communication links are not re-established in the previous location in block 1114, the aircraft 100 may select a landing destination in block 1116. Example potential landing destinations may include, but are not limited to, one or more airports along the planned route and/or one or more other landing locations. The aircraft may have the contingency airports and/or other landing locations stored prior to flight (e.g., in contingency data). In some implementations, the aircraft 100 may be configured to continue to the destination airport 108-2 if the aircraft is past a threshold location in the flight plan, such as past half way to the destination airport 108-2. In these implementations, the aircraft 100 may be configured to return to the origin airport 108-1 if the aircraft 100 is not past the threshold location. In some implementations, if the aircraft 100 has received one or more ATC clearances from the destination airport 108-2 (e.g., airspace and/or landing clearances), the aircraft 100 may continue to the destination airport 108-2 to land.

In block 1118, the aircraft 100 may send one or more lost communication notices indicating that communications have been lost and the aircraft is landing. In block 1120, the aircraft 100 may land at the selected destination (e.g., the origin/destination airport or other contingency site). In some implementations, the aircraft 100 may be configured to loiter at the selected destination (e.g., origin/destination airport or other location) and/or send the lost communication notice to the selected destination for greater than a threshold period of time in order to provide time at the selected destination to clear the airspace and make other accommodations.

In some implementations, C2 link quality may be monitored on previous flights for use in subsequent flights. For example, the aircraft 100 (or other previous aircraft) may monitor and store locations associated with high quality C2 link connections. The C2 link quality and associated locations may be provided to the GCS 102 and uploaded to the aircraft 100 (e.g., in contingency data). In some implementations, if a C2 link is lost, the aircraft 100 (e.g., contingency system 200) may select a location to re-establish the link based on the previously surveyed C2 link quality data.

FIG. 12 illustrates an example method for managing a lost communication scenario during landing. For example, the lost communication scenario illustrated in FIG. 12 may address lost communications as the aircraft 100 is descending to an altitude near a predefined decision altitude (e.g., 200 ft). Prior to landing, the aircraft 100 may be configured to receive a GCS landing clearance that indicates the aircraft 100 is cleared to land. The GCS landing clearance may be initiated by the GCS 102 (e.g., remote operator) in response to validating that the aircraft is on an appropriate trajectory for landing. For example, the remote operator may determine that the aircraft 100 is on an appropriate trajectory if the aircraft 100 is centered on the runway and within a specified landing location along the length of the runway, as described with respect to the landing validation system 222, 514. The operator may also verify that the path to the runway is clear and there is no traffic on the runway.

The decision altitude may represent a threshold altitude where the GCS 102 is expected to have made the GCS landing clearance decision. Receiving the GCS landing clearance at the aircraft 100 may set a 'landing flag' at the aircraft 100 indicating the landing should proceed. Without GCS landing clearance by the decision altitude, the aircraft 100 may be configured to execute a missed approach at the destination airport. Note that the GCS landing clearance is a separate clearance from the one or more ATC clearances.

In block 1200, the aircraft 100 receives contingency data including landing lost communication conditions, management operations, and other continency data for handling lost communications during landing. In block 1202, the aircraft 100 may receive one or more ATC clearances from the destination airport 108-2 for entry into the airspace and landing at the airport. In block 1204, the aircraft 100 initiates descent towards landing at the airport according to the flight plan.

In block 1206, communication is lost near the decision altitude. An example decision altitude may include a threshold of 200$ft$ in some examples, although other altitude values may be used, such as a range of altitudes (e.g., 100 ft-200 ft). The decision altitude may be chosen as an altitude below which it is more appropriate to land the aircraft 100 rather than perform a missed approach. If the aircraft 100 has received GCS landing clearance from the GCS 102 and the aircraft 100 has reached/breached the decision altitude (e.g., below 200 ft) in block 1208, the aircraft may continue landing according to the flight plan in block 1210.

If the aircraft has not yet received GCS landing clearance (e.g., due to lost communications) and has reached the decision altitude in block 1208, the aircraft 100 may perform a missed approach (e.g., go around) maneuver and enter a holding pattern at the destination airport in block 1212 (e.g., according to contingency data). The aircraft 100 may attempt to re-establish communications in the holding pattern. If the aircraft 100 re-establishes communications in the holding pattern in block 1214, the aircraft 100 may land according to the flight plan and/or additional GCS commands in block 1216.

If the aircraft 100 does not re-establish communications in the holding pattern in block 1214, the aircraft 100 may send a lost communication notice and attempt to land at the destination airport 108-2 in block 1218. For example, the aircraft 100 may be configured to loiter at the destination airport and/or send the lost communication notice for greater than a threshold period of time in order to provide time at the destination airport to clear the airspace and make other accommodations.

The aircraft 100 may encounter a plurality of different contingency scenarios that may include component and/or system-level failures and errors during flight. Example component/system failures may include, but are not limited to, GNSS failure (e.g., GPS failure), air data failure (e.g., air sensor/computer failure), INS failure, partial/complete actuation failures, and/or power failures (e.g., engine failure). The aircraft 100 (e.g., contingency systems 200) may be configured to detect one or more types of component/system failures during flight. The aircraft 100 (e.g., contingency systems 200) may also be configured to provide contingency management operations that include failure-specific responses to the detected failures. In some implementations, the aircraft 100 may include redundant systems/devices that may be engaged in response to failure. For example, the aircraft 100 may include redundant sensors and computing devices that may be engaged in the event of a detected failure.

In some cases, the aircraft 100 may operate in one or more failure modes in response to detection of a component/system failure. The failure modes may be referred to herein according to the detected failure. For example, GNSS failure, air data failure, INS failure, actuator failure, and power failure (e.g., engine failure) may cause the aircraft 100 to enter a GNSS failure mode, air data failure mode, INS failure mode, actuator failure mode, and power failure mode (e.g., engine failure mode), respectively. The different failure modes may include some contingency management operations that are similar, such as attempted recovery of lost functionality and reporting of errors to GCS/ATC. The different failure modes may also include failure-specific operations. In some cases, an aircraft 100 may face multiple contingency scenarios during a single flight. For example, the scenarios may occur sequentially or simultaneously. In the case of multiple simultaneous contingency scenarios, the aircraft 100 (e.g., contingency systems 200) may implement the contingency management operations described herein for each scenario. In some cases, the aircraft 100 (e.g., contingency systems 200) may be configured to prioritize contingency management operations that are more critical. For example, the criticality of the scenario may inform how soon thereafter the aircraft lands, as outlined in the following ordered list: 1) non-critical failure: continue to destination, 2) aircraft can fly safely, but has lost a redundant system: land at nearest designated emergency airport, and 3) loss of all engine power: glide to a designated zone.

FIG. 13 illustrates example operations for an aircraft 100 (e.g., contingency systems 200) that may detect and respond to component/system failures. In block 1300, the aircraft 100 receives taxi plans and a flight plan. In block 1302, the aircraft 100 receives contingency data including contingency detection operations, contingency management operations, and other contingency data (e.g., contingency landing sites). The contingency detection and management operations may include a variety of detection/management operations associated with the component/system failures described herein.

In block 1304, the aircraft 100 executes the taxi plan and initiates takeoff. During flight, the aircraft 100 may determine whether one or more component or system errors/failures occur in block 1306. If no errors/failures are detected during flight (e.g., in block 1306), the aircraft 100 may continue according to the flight plan in block 1308. If the aircraft 100 detects errors/failures in block 1306, the aircraft 100 may initiate specific contingency management operations directed to the detected error/failure. Example management operations are described herein for a variety of different errors/failures, such as GNSS failure, air data failure, INS failure, actuator failure, engine failure, and other errors/failures.

The aircraft 100 may attempt to recover loss of functionality in block 1312 as part of the contingency management operations. For example, the aircraft 100 may attempt to restart a sensor, restart the engine, and/or perform other recover operations that are specific to the error/failure. In block 1314, the aircraft 100 may report the detected error/failure to GCS 102 and/or ATC 106. In some implementations, the aircraft 100 may receive GCS commands directed to the specific error/failure in block 1316. In block 1318, the aircraft 100 may execute the received GCS commands and/or other contingency management operations.

FIG. 14 is a flow diagram that illustrates example operations that the aircraft 100 and/or GCS 102 may implement in the event of engine failure. An engine failure scenario may be referred to as a power off landing scenario. In block 1400, the aircraft 100 receives taxi plans and a flight plan from the GCS 102. In block 1402, the aircraft 100 receives contingency data including power off landing detection and management operations along with other contingency data (e.g., contingency landing sites). In block 1404, the aircraft 100 executes the taxi plan and takes off.

During the flight in block 1406, the aircraft 100 (e.g., contingency systems 200) detects degraded engine performance and/or engine failure. In block 1408, the aircraft 100 notifies GCS 102 of the engine degradation/failure. In block 1410, the aircraft 100 adjusts to a best glide speed and attempts to restart the engine (e.g., according to power off contingency management operations). The aircraft 100 may attempt an engine restart a plurality of times in block 1410. If the engine restarts in block 1412, and power is restored, the aircraft 100 may continue according to the flight plan, subject to GCS commands in block 1414. For example, GCS 102 may command the aircraft 100 to land at a contingency site in response to such a contingency scenario.

If the engine does not restart in block 1412, the GCS 102 may render an engine failure interface (e.g., GUI) at the GCS 102 and receive operator input for handling the engine failure in block 1416. In some implementations, an interface at the GCS 102 may notify the remote operator of the engine failure and provide the remote operator with a GUI that allows the operator to select a contingency landing site. For example, the operator may manually select (e.g., touch or click) a contingency landing site from a plurality of contingency landing sites/airports in a list format. In some implementations, the GCS computing systems may render a map GUI including the plurality of contingency landing sites/airports in the area surrounding the aircraft. The map GUI may assist the remote operator in manually selecting the GUI landing site (e.g., by touching/clicking a location in the map). Additionally, or alternatively, the aircraft 100 may be configured to automatically select one of the contingency landing sites. In block 1418, the aircraft 100 lands according to the operator-selected landing site or the aircraft-selected landing site.

In some implementations, the aircraft 100 (e.g., contingency systems 200) may detect a failure in the GNSS system(s) (e.g., a GPS data error). For example, the aircraft 100 may determine that the GNSS system is offline and/or not producing GPS data. As another example, the aircraft 100 may detect GPS data that is corrupt. The aircraft 100 may attempt to restore GNSS functionality (e.g., by powering on/off the GNSS system). The aircraft 100 may also notify the GCS 102 in response to detecting a failure in the GNSS system(s). In some implementations, the aircraft 100 may also send out one or more error communication notices, such as one or more transponder code(s) and/or VHF radio voice transmissions.

In some implementations, the aircraft 100 may automatically take initial control actions in response to the detected failure, such as leveling off the aircraft. The GCS 102 and aircraft 100 may also estimate current aircraft state and location based on the most recent state/location of the aircraft and additional valid current sensor data, such as the INS data. In some implementations, the aircraft may enter a contingency control mode (e.g., a GNSS/GPS error control mode) in response to detection of GNSS errors. In some implementations, the GCS may command the aircraft into the contingency control mode. In the contingency control mode, the GCS may control the aircraft using heading, altitude, and airspeed commands (e.g., a heading-altitude-airspeed control mode) set by the GCS operator. In some implementations, the GCS may request for flight vectoring from ATC. For example, the GCS may request that the ATC report a desired direction for the aircraft. In response, the GCS may direct the aircraft in the desired direction.

In some implementations, the aircraft 100 (e.g., contingency systems 200) may detect a failure in the air data system (e.g., a Pitot-static tube, air data computer, etc.). For example, the aircraft 100 may determine that the air data system is offline and/or not producing data. As another example, the aircraft 100 may detect data from the air data system that is corrupt. The aircraft 100 may attempt to restore air data system functionality (e.g., by powering on/off the air data system). The aircraft 100 may also notify the GCS 102 in response to detecting a failure in the air data system. In some implementations, the aircraft 100 may also send out one or more error communication notices, such as one or more transponder code(s) and/or VHF radio voice transmissions.

The GCS 102 and the aircraft 100 may estimate data typically associated with the air data system (e.g., airspeed) based on INS data, GPS data, and/or winds aloft data. In this case, the aircraft may control itself in an "airspeed estimation mode." In some implementations, the aircraft may enter a contingency control mode (e.g., an air data error control mode) in response to detection of air data system errors. In some implementations, the GCS may command the aircraft into the contingency control mode. In the contingency control mode, the GCS may control the aircraft using heading, altitude, and airspeed commands (e.g., a heading-altitude-airspeed control mode) set by the GCS operator. In some implementations, the GCS may request additional aircraft flight data from the ATC.

In some implementations, the aircraft 100 (e.g., contingency systems 200) may detect a failure in the INS. For example, the aircraft 100 may determine that the INS is offline and/or not producing data. As another example, the aircraft 100 may determine that data from the INS is corrupt. The aircraft 100 may attempt to restore INS functionality (e.g., by powering on/off the INS). The aircraft 100 may also notify the GCS 102 in response to detecting a failure in the INS. In some implementations, the aircraft 100 may also send out one or more error communication notices, such as one or more transponder code(s) and/or VHF radio voice transmissions.

In response to INS failure, the GCS 102 and the aircraft 100 may attempt to return the aircraft to a wings level state (e.g., a zero bank angle) based on aircraft state data and other data available at/before failure of the INS. The aircraft/GCS may report the INS failure to ATC indicating the latest location and state of the aircraft. In some implementations, the GCS may request additional aircraft flight data from ATC. The aircraft/GCS may determine the location of the aircraft using the GNSS. In these implementations, the aircraft/GCS may control the aircraft to reduce velocity and attempt a landing at a contingency site, such as an unpopulated area. During the attempted landing, the aircraft may implement detect and avoid operations to avoid air and ground traffic. In some implementations, the aircraft may be configured to throttle idle and fully deflect the rudder.

In some implementations, the aircraft 100 (e.g., contingency systems 200) may detect partial loss of actuator control. Partial loss of actuator control may apply to errors/failure associated with any aircraft actuators 212 (e.g., power lever actuators, control surface actuators, etc.). In some implementations, the aircraft 100 may detect a loss in range of movement associated with an actuator and/or a complete loss of actuator control (e.g., an immobile/jammed actuator or a floating actuator). In some implementations, the aircraft 100 may detect loss of actuator feedback or corrupt feedback data. In some implementations, the aircraft 100 may detect a partial loss of actuator control based on unexpected aircraft movement in response to actuator commands, such as movement that deviates the aircraft from the flight plan. The aircraft/GCS may determine which actuator is failing and control the aircraft according to the detected failure. The aircraft may also report the error/failure to GCS as well as data supporting conclusions indicating which actuator is failing.

The aircraft/GCS may determine which actuators can be controlled and the corresponding options for overall aircraft control. In some implementations, the aircraft/GCS may select a viable contingent landing site and land the aircraft based on the control options. In scenarios where loss of actuation results in an inability to control the aircraft, the aircraft/GCS may have more limited contingency landing options. In these implementations, the aircraft/GCS may report to ATC that GCS has lost the ability to control the aircraft.

In some implementations, the aircraft/GCS 100, 102 may determine that the aircraft is on an incorrect flight path. The aircraft/GCS 100, 102 may detect an incorrect flight path scenario in response to the aircraft 100 breaching a geofence boundary associated with the flight plan. Detection of the incorrect flight path scenario (e.g., fly away) by the aircraft 100, GCS 102, ATC 106, and/or another aircraft may indicate that the aircraft 100 is on a trajectory that was not planned or commanded.

Incorrect flight path scenarios may be caused by one or more of the lost communication scenarios described herein. Incorrect flight path may also be caused by one or more component/systems errors described herein. In some cases, an incorrect flight path may be caused by weather. For example, a strong crosswind may push the aircraft off course. In these cases, the aircraft may lack enough control authority to place itself back on the flight path. In some cases, an incorrect flight path may be caused by incorrect/corrupted flight plan data and/or geofence data. For example, the flight plan data and/or geofence data may be corrupted during transmission and/or on the aircraft. As another example, the flight plan or contingency plans may include one or more incorrect waypoints outside of the geofence boundary. In the case of corrupt/incorrect data, the aircraft may correctly follow the flight plan, but run into the geofence boundary.

An incorrect flight path may be reported by the aircraft, ATC, or other aircraft. In some implementations, the aircraft may notify the GCS that the aircraft has breached the geofence boundary. In some implementations, the ATC may notify the GCS (e.g., via the aircraft or other communication) that the aircraft is off course (e.g., based on a filed flight plan). In some implementations, the aircraft may attempt to loiter at the geofence boundary or a location near the last location at which the aircraft was inside of the geofence boundary. The aircraft may loiter for a specified period of time (e.g., defined in contingency data) to provide GCS ample time to correct the data error(s).

In some implementations, the GCS operator may take control of the aircraft. For example, the aircraft may enter into a contingency control mode in which the aircraft is controlled by GCS commands. In the contingency control mode, the GCS may control the aircraft using heading, altitude, and airspeed commands (e.g., a heading-altitude-airspeed control mode) set by the GCS operator. In the case of weather related path errors, the GCS may command the aircraft to an altitude/location that may present fewer weather related control issues. In the case of incorrect flight plan data and/or geofence data, the GCS may correct the flight plan and/or geofence data. The aircraft may then use the corrected flight plan and/or geofence data. In some implementations, the aircraft may provide a corrected flight plan to the GCS for approval.

Another example contingency scenario may include aircraft hijacking via one or more communication links. In this scenario, the operator may recognize the hijacking at the GCS. For example, the GCS may receive an alert that the aircraft is not following an anticipated flight path (e.g., as verified by an external source of ADS-B data). If other contingency management operations are not effective in restoring control of the aircraft, responses to queries are off nominal, and/or system self-diagnostics are nominal, then hijacking may be presumed. In this example, the crew and ATC may be notified. In some implementations, the GCS may attempt to establish communication with the aircraft via a different communication link (e.g., different type of link and/or different frequency). The GCS may also shut down communications through the hijacked communication link.

FIGS. 15A-15C illustrate a table that includes example high level function allocation by phase of flight. The table represents example responsibilities and roles of each party. For example, each row includes a phase of flight and responsibilities for the UA-GCS, remote operator, and ground crew. The responsibilities may include execute, informed, supervise, and action required. The execute responsibility may include execution by a computing system/device and/or human operator. The informed designation may indicate that the party has knowledge of the task, but may not be required or able to affect the task. The supervise designation may indicate that the party may take action to change the task. The action required designation may indicate that the party is required to complete/verify the task.

Components of the aircraft 100 and the GCS 102 illustrated herein, such as the systems, modules, and data may represent features included in the aircraft 100 and the GCS 102. The systems, modules, and data described herein may be embodied by various aircraft avionics, including electronic hardware, software, firmware, or any combination thereof. Depiction of different components as separate does not necessarily imply whether the components are embodied by common or separate electronic hardware or software components. In some implementations, the components depicted herein may be realized by common electronic hardware and software components. In some implementations, the components depicted herein may be realized by separate electronic hardware and software components.

The electronic hardware and software components may include, but are not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits that are configured to control communication between electronic components.

The one or more processing units may include one or more central processing units (CPUs), graphics processing units (GPUs), digital signal processing units (DSPs), or other processing units. The one or more processing units may be configured to communicate with memory components and I/O components. For example, the one or more processing units may be configured to communicate with memory components and I/O components via the interconnect components.

A memory component (e.g., main memory and/or a storage device) may include any volatile or non-volatile media. For example, memory may include, but is not limited to, electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDD), magnetic tape drives, optical storage technology, or any other memory components.

Memory components may include (e.g., store) data described herein. Memory components may also include instructions that may be executed by one or more processing units. For example, memory may include computer-readable instructions that, when executed by one or more processing units, cause the one or more processing units to perform the various functions attributed to the systems/modules described herein. The I/O components may refer to electronic hardware and software that provides communication with a variety of different devices. For example, the I/O components may provide communication between other devices and the one or more processing units and memory components.

What is claimed is:

1. An aircraft comprising:
one or more memory components configured to store:
a flight plan; and
contingency data including a plurality of contingency landing sites;
a communication system configured to;
communicate with a ground control station via a communication link while the aircraft is en route from an origin airport to a destination airport; and
detect a lost communication scenario in response to degradation in the communication link between the aircraft and the ground control station;
attempt, based on the detection of the lost communication scenario, to re-establish the communication link by at least one of switching to a second communication system or restarting the communication system; and
a flight control system configured to:
control the aircraft en route from the origin airport to the destination airport according to the flight plan;
in response to detecting the lost communication scenario and failing to re-establish the communication link by at least one of the switching to the second communication system or the restarting the communication system:
access a previously known location in which the communication link was not degraded between the aircraft and the ground control station; and
route the aircraft back to the accessed previously known location in which the communication link was not degraded between the aircraft and the ground control station, wherein the communication system is configured to attempt to re-establish the communication link at the previously known location;
in response to failure to re-establish the communication link at the previously known location, select a lost communication landing site from a plurality of potential landing sites based on a current location of the aircraft relative to the plurality of potential landing sites, wherein the potential landing sites include at least one of the origin airport, the destination airport, and a first contingency landing site included in the contingency data; and control the aircraft to approach and land at the selected lost communication landing site.

2. The aircraft of claim 1, wherein the flight plan and the contingency data is received from the ground control station via the communication system prior to takeoff from the origin airport.

3. The aircraft of claim 1, wherein the communication system is configured to transmit a lost communication notice stored in the contingency data in response to detecting the lost communication scenario, wherein the lost communication notice includes at least one of a transponder code and a stored voice transmission via very high frequency (VHF) radio.

4. The aircraft of claim 3, wherein the flight control system is configured to transmit the lost communication notice for a threshold period of time prior to approach and landing at the selected lost communication landing site, and wherein the threshold period of time is defined in the contingency data.

5. The aircraft of claim 1, wherein the lost communication scenario is an en route lost communication scenario, wherein the communication system is configured to detect a takeoff lost communication scenario in response to degradation in the communication link between the aircraft and the ground control station during takeoff from the origin airport.

6. The aircraft of claim 5, wherein the flight control system is configured to:

in response to detecting the takeoff lost communication scenario prior to a threshold location on a runway, slow the aircraft to a stop and taxi the aircraft to a predetermined location at the origin airport defined in the contingency data; and in response to detecting the takeoff lost communication scenario after passing the threshold location on the runway, control the aircraft to climb and enter a holding pattern near the origin airport according to the contingency data.

7. The aircraft of claim 6, wherein, while climbing and entering the holding pattern, the communication system is configured to transmit a lost communication notice stored in the contingency data, wherein the lost communication notice includes at least one of a transponder code and a stored voice transmission via very high frequency (VHF) radio.

8. The aircraft of claim 1, wherein the lost communication scenario is an en route lost communication scenario, wherein the communication system is configured to detect a landing lost communication scenario in response to degradation in the communication link between the aircraft and the ground control station during an approach towards the destination airport.

9. The aircraft of claim 8, wherein, when the aircraft is at a decision threshold altitude during a landing lost communication scenario, the flight control system is configured to:

perform a missed approach maneuver according to the contingency data if the aircraft has not received a landing clearance from the ground control station; and control the aircraft to land at the destination airport according to the flight plan if the aircraft has received the landing clearance from the ground control station.

10. The aircraft of claim 9, wherein the communication system is configured to transmit landing validation data to the ground control station that indicates a predicted landing location on a runway at the destination airport, and wherein the landing clearance received by the communication system indicates a human operator has validated the predicted landing location on the runway.

11. A non-transitory computer-readable medium comprising computer-executable instructions configured to cause one or more processing units of an aircraft to:

store a flight plan on the aircraft;

store contingency data including a plurality of contingency landing sites;

communicate from the aircraft with a ground control station via a communication link while the aircraft is en route from an origin airport to a destination airport;

detect a lost communication scenario in response to degradation in the communication link between the aircraft and the ground control station;

control the aircraft en route from the origin airport to the destination airport according to the flight plan;

attempt, based on the detection of the lost communication scenario, to re-establish the communication link by at least one of switching to a second communication system or restarting a communication system;

in response to detecting the lost communication scenario and failing to re-establish the communication link by at least one of the switching to the second communication system or the restarting the communication system:

access a previously known location in which the communication link was not degraded between the aircraft and the ground control station; and route the aircraft back to the accessed previously known location in which the communication link was not degraded between the aircraft and the ground control station;

attempt to re-establish the communication link;

in response to failure to re-establish the communication link at the previously known location, select a lost communication landing site from a plurality of potential landing sites based on a current location of the aircraft relative to the plurality of potential landing sites, wherein the potential landing sites include at least one of the origin airport, the destination airport, and a first contingency landing site included in the contingency data; and control the aircraft to approach and land at the selected lost communication landing site.

12. The computer-readable medium of claim 11, wherein the flight plan and the contingency data is received from the ground control station at the aircraft prior to takeoff from the origin airport.

13. The computer-readable medium of claim 11, further comprising instructions that cause the one or more processing units to transmit a lost communication notice stored in the contingency data in response to detecting the lost communication scenario, wherein the lost communication notice includes at least one of a transponder code and a stored voice transmission via very high frequency (VHF) radio.

14. The computer-readable medium of claim 13, further comprising instructions that cause the one or more processing units to transmit the lost communication notice for a threshold period of time prior to approach and landing at the selected lost communication landing site, wherein the threshold period of time is defined in the contingency data.

15. The computer-readable medium of claim 11, wherein the lost communication scenario is an en route lost communication scenario, and wherein the instructions are configured to cause the one or more processing units to detect a takeoff lost communication scenario in response to degradation in the communication link between the aircraft and the ground control station during takeoff from the origin airport.

16. The computer-readable medium of claim 15, further comprising instructions that cause the one or more processing units to:
   in response to detecting the takeoff lost communication scenario prior to a threshold location on a runway, slow the aircraft to a stop and taxi the aircraft to a predetermined location at the origin airport defined in the contingency data; and
   in response to detecting the takeoff lost communication scenario after passing the threshold location on the runway, control the aircraft to climb and enter a holding pattern near the origin airport according to the contingency data.

17. The computer-readable medium of claim 16, wherein, while climbing and entering the holding pattern, the instructions are configured to cause the one or more processing units to transmit a lost communication notice stored in the contingency data, wherein the lost communication notice includes at least one of a transponder code and a stored voice transmission via very high frequency (VHF) radio.

18. The computer-readable medium of claim 11, wherein the lost communication scenario is an en route lost communication scenario, and wherein the instructions are configured to cause the one or more processing units to detect a landing lost communication scenario in response to degradation in the communication link between the aircraft and the ground control station during an approach towards the destination airport.

19. The computer-readable medium of claim 18, wherein, when the aircraft is at a decision threshold altitude during a landing lost communication scenario, the instructions are configured to cause the one or more processing units to:
   perform a missed approach maneuver according to the contingency data if the aircraft has not received a landing clearance from the ground control station; and
   control the aircraft to land at the destination airport according to the flight plan if the aircraft has received the landing clearance from the ground control station.

20. The computer-readable medium of claim 19, wherein the instructions are configured to cause the one or more processing units to transmit landing validation data to the ground control station that indicates a predicted landing location on a runway at the destination airport, and wherein the landing clearance received by the aircraft indicates a human operator has validated the predicted landing location on the runway.

* * * * *